US008650375B2

(12) United States Patent
Hattori et al.

(10) Patent No.: US 8,650,375 B2
(45) Date of Patent: *Feb. 11, 2014

(54) VIRTUAL MACHINE CONTROL PROGRAM AND VIRTUAL MACHINE SYSTEM

(75) Inventors: Naoya Hattori, Hadano (JP); Toshiomi Moriki, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 13/338,806

(22) Filed: Dec. 28, 2011

(65) Prior Publication Data

US 2012/0124575 A1 May 17, 2012

Related U.S. Application Data

(63) Continuation of application No. 12/030,498, filed on Feb. 13, 2008, now Pat. No. 8,099,575.

(30) Foreign Application Priority Data

Jun. 6, 2007 (JP) ................................. 2007-150973

(51) Int. Cl.
*G06F 12/00* (2006.01)
*G06F 13/00* (2006.01)
*G06F 13/28* (2006.01)

(52) U.S. Cl.
USPC ........................................................ 711/163

(58) Field of Classification Search
None
See application file for complete search history.

(56) References Cited

U.S. PATENT DOCUMENTS

| 6,397,242 B1 | 5/2002 | Devine et al. |
| 6,907,600 B2 | 6/2005 | Neiger et al. |
| 6,996,748 B2 | 2/2006 | Uhlig et al. |
| 7,409,487 B1 | 8/2008 | Chen et al. |
| 2006/0161719 A1 | 7/2006 | Bennett et al. |
| 2006/0174053 A1 | 8/2006 | Anderson et al. |

OTHER PUBLICATIONS

Intel® 64 and IA-32 Architectures Software Developer's Manual, vol. 3A: System Programming Guide, Part 1. Aug. 2007.
AMD64 Technology AMD64 Architecture Programmer's Manual vol. 2: System Programming, Sep. 2006.

*Primary Examiner* — Christian P Chace
*Assistant Examiner* — Gary W Cygiel
(74) *Attorney, Agent, or Firm* — Mattingly & Malur, PC

(57) ABSTRACT

The program attains compatibility of suppression of an overhead accompanying page exception handling in the case of operating a program whose amount of memory use is large on a virtual machine and suppression of the overhead accompanying page exception handling in the case of operating a first OS that has a function of making another OS run on a virtual machine. A VMM creates a shadow PT (Page Table) for prohibiting reading-writing of privileged memory that requires emulation of reading/writing by using a RSV-bit, and registers the shadow PT and the second PT that a second OS operating on the first OS has in an x86 compatible CPU equipped with page exception detecting function using two PT's. When a page exception occurs, the VMM refers to cause code of the page exception and, when a P field of the cause code is 0, determines immediately that emulation is unnecessary.

6 Claims, 30 Drawing Sheets

FIG. 8

| I/D | RSVD | U/S | W/R | P |
|-----|------|-----|-----|---|
| 1240 | 1230 | 1220 | 1210 | 1200 |

Reserved — 1250

FIG. 9

| GUEST NUMBER | FIRST PT ADDRESS | FIRST PT FORMAT INFORMATION | RESERVED-BIT USE HISTORY |
|---|---|---|---|
| 1 | 0x00003000 | Intel64 FORMAT | 0 |
| : | : | : | : |
| n | 0x00010000 | NON-Intel64 FORMAT (WITH PDP) | 1 |

| GUEST NUMBER 1300 | SECOND PT ADDRESS 1350 | SECOND PT FORMAT INFORMATION 1355 | RESERVED-BIT USE HISTORY 1320 |
|---|---|---|---|
| 1 | 0x00003000 | Intel64 FORMAT | 0 |
| .. | .. | .. | .. |
| n | 0x00010000 | NON-Intel64 FORMAT (WITH PDP) | 1 |

FIG. 31

| XD - Available | Reserved | START ADDRESS OF PAGE FRAME | Available - R/W | P |
|---|---|---|---|---|
| 0 | 0 | 0x00000000 (MEMORY ADDRESS) | 0 | 0 |
| 0 | 0 | 0x00010000 (MEMORY ADDRESS) | 0 | 1 |
| 0 | 0 | 0xFEE00000 (I/O DEVICE ADDRESS) | 0 | 1 |
| .... | .... | .... | .... | .... |
| 0 | 0 | 0xFFC00000 (I/O DEVICE ADDRESS) | 0 | 1 |

FIG. 32

| XD - Available | Reserved | START ADDRESS OF PAGE FRAME | Available - R/W | P |
|---|---|---|---|---|
| 0 | 0 | 0x00000000 (MEMORY ADDRESS) | 0 | 0 |
| 0 | 0 | 0x00010000 (MEMORY ADDRESS) | 0 | 1 |
| 0 | 0 | 0xFEE00000 (I/O DEVICE ADDRESS) | 0 | 0 |
| .... | .... | .... | .... | .... |
| 0 | 0 | 0xFFC00000 (I/O DEVICE ADDRESS) | 0 | 0 |

FIG. 33

| XD - Available | Reserved | START ADDRESS OF PAGE FRAME | Available - R/W | P |
|---|---|---|---|---|
| 0 | 0 | 0x00000000 (MEMORY ADDRESS) | 0 | 0 |
| 0 | 0 | 0x00010000 (MEMORY ADDRESS) | 0 | 1 |
| 0 | 1 | 0xFEE00000 (I/O DEVICE ADDRESS) | 0 | 1 |
| .... | .... | .... | .... | .... |
| 0 | 1 | 0xFFC00000 (I/O DEVICE ADDRESS) | 0 | 1 |

VIRTUAL MACHINE CONTROL PROGRAM AND VIRTUAL MACHINE SYSTEM

CLAIM OF PRIORITY

This application is a continuation application of U.S. Ser. No. 12/030,498, filed on Feb. 13, 2008, which claims priority from Japanese application JP 2007-150973 filed on Jun. 6, 2007, the entire contents of which are hereby incorporated by reference into this application.

FIELD OF THE INVENTION

The present invention relates to a control program of a virtual machine and a virtual machine system, and, more specifically, to a useful technology that can be applied to a control program for determining necessity of emulation for a memory operation by a guest and a virtual machine system that is run by this program.

BACKGROUND OF THE INVENTION

In recent years, with an increasing number of servers, complexity related to operations has been enlarged and operation cost has become a problem.

As a technology to reduce the operation cost, server integration whereby a plurality of servers are integrated into a single server has attracted attention. As a technology of realizing server integration, the virtual machine technology that divides a single computer logically at arbitrary ratios is known. With the virtual machine technology, for example, firmware (or middleware), such as a hypervisor, divides a physical computer into a plurality of logical partitions (LPAR: Logical partition), allocates computer resources (a CPU, a main storage, and I/O) to each LPAR, and makes an OS work on each LPAR, respectively. Alternatively, a single host OS (OS that directly uses the physical machine) is executed on a single server, and a hypervisor that operates on this host OS performs the same division processing and makes a plurality of guest OS's (OS that operates on the host OS) perform operations.

In this way, the virtual machine technology enables OS's that operated on a plurality of servers conventionally and pieces of software that operated on the OS's to operate on a single server, realizing server integration. Although the virtual machine technology is a technology that has heretofore been used in large computers, such as main frames, it is spreading also with low-end servers and personal computers with improved performance of microprocessors in recent years. Incidentally, regarding the virtual machine technology, the following techniques are generally known.

For example, U.S. Pat. No. 6,907,600 describes a software technique of emulating a memory privileged instruction using an x86 compatible CPU. With this technique, a shadow page table (active translation data structure) is provided on a virtual machine monitor (hereinafter referred to as VMM), and a P-bit of this shadow page table is set to "0" in order to perform judgment of the necessity of emulation.

U.S. Pat. No. 6,996,748 shows a hardware function (Page Fault Error Code Mask/Match) in the virtual technology generally called VT-x (Virtualization Technology for x86). In recent years, the x86 compatible CPU tends to have added a function of supporting the VMM. The use of this Page Fault Error Code Mask/Match function improves efficiency of judgment of the necessity of emulation with respect to page exception.

U.S. Pat. No. 6,397,242 describes a software technique of realizing virtual software using the x86 compatible CPU. Specifically, it illustrates an emulation method of register privileged instructions/memory privileged instructions.

Intel(R)64 and IA-32 Architectures Software Developer's Manual describes a basic architecture of a CPU of Intel, and AMD64 Architecture Programmer's Manual describes a basic architecture of a CPU of AMD.

SUMMARY OF THE INVENTION

A computer, such as a server, that adopts the virtual machine technology as described above has a plurality of virtual machines (VM's) that allow respective guests (a general term of the guest OS's and all the pieces of software operating on the respective guest OS's) and virtual machine monitors (VMM's) each for performing a control of the virtual machine. Some of the OS's operating on the VMM's each have a function of allowing another OS to operate on the OS, as Xen-compatible Linux and Windows (Registered Trademark) Hypervisor. Below, the OS equipped with the function of making another OS operate is called a first OS. On the other hand, the OS that is not equipped with the function of making another OS operate is called a second OS.

Generally the guest is made on the precondition of occupying hardware of the machine. Therefore, from a viewpoint to realize server integration by the virtual machine technology, it is necessary to make each virtual machine perform the same operations as those of a case where the each guest occupies the machine. In order to satisfy this requirement, the VMM performs emulation of a privileged instruction included in the guest (the instruction that operates hardware). Since this emulation may cause performance decrement (overhead), rapidity is required for the emulation.

The operations of hardware are broadly divided into operations of privileged memory that are used for controls of I/O devices and operations on privileged registers in the CPU. Therefore, privileged instruction can be classified into memory privileged instruction accompanying an operation of the privileged memory, and the register privileged instruction not accompanying the operation of the privileged memory. The register privileged instruction can be emulated fast if using VMM support functions, such as, a VT-x function installed on the x86 compatible CPU's manufactured by Intel and an AMD-V (AMD Virtualization) function installed on the x86 compatible CPU's manufactured by AMD. On the other hand, since overhead changes largely depending on a method of simulation, the method of emulation of the memory privileged instruction becomes important.

FIGS. 1 and 2 show configuration examples of a virtual machine system considered to be required to perform the emulation of the memory privileged instructions in the case where a plurality of second OS's are made to operate using a machine with a mounted x86 compatible CPU. In FIG. 1, in doing the emulation, a page exception detecting function 71 that a CPU 60 mounted on a physical machine 10 provides is used. In order to suppress the overhead accompanying the emulation, a VMM 20 judges necessity of the emulation and, only when it is judged necessary, performs the emulation.

The page exception detecting function 71 includes a TLB 73 for holding access approval/disapproval information in each memory area and a PT address register 72 for holding a memory address of a page table (PT) for holding the access approval/disapproval information in the each memory area. The access approval/disapproval information includes a Present bit (P-bit) for disabling all the reading/writing, a Read/Write bit (R/W bit) for disabling writing, and a Reserved bit (RSV-bit) for disabling all the reading/writing. When a memory operation that violates the access approval/disapproval information is detected, the page exception detecting function 71 generates a page exception, and transfers program execution to an event handler 80. Moreover, it passes a cause code indicating which bit of the access approval/disapproval information the memory operation violates to the event handler 80.

The VMM 20 constitutes a virtual machine 25 (25-1 to 25-*n*), and a second OS 40 (40-1 to 40-*n*) operating on the VMM 20 has a second PT 170 (170-1 to 170-*n*) and a second event handler 172 (172-1 to 172-*n*), and sets the access approval/disapproval information in the each memory area in the second PT 170. Moreover, an application (AP) 50 (50-1 to 50-*m*) works on the second OS 40.

Referring to the second PT 170, the VMM 20 creates a shadow PT 140 to which access prohibition is added using the P-bit and an R/W-bit to the privileged memory, and stores it in the PT address register 72. The page exception detecting function 71 copies a setting of the shadow PT 140 to the TLB 73, and judges a page exception according to the setting of the shadow PT 140.

When the event handler 80 is called on an occasion of the page exception, in order that the VMM 20 judges whether the page exception results from an operation of the privileged memory or whether it results from an operation of the memory (a guest exception) that is specified as access-disapproved by the second PT 170, the VMM calls a page exception cause code analysis part 90 and a second PT analysis part 115. The page exception cause code analysis part 90 refers to the cause code passed from the page exception detecting function 71. When there is no violation in both the P-bit and the R/W-bit in the cause code, the VMM 20 determines that the page exception results from the guest exception, and calls an event report part 120. The event report part 120 creates the cause code and passes it to the guest, and causes a branch to the second event handler 172.

Only when there is violation in the cause code of either the P-bit or the R/W-bit, the VMM 20 calls the second PT analysis part 115. The second PT analysis part 115 refers to the second PT 170 and analyzes whether access prohibition is set regarding the bit shown by the cause code in the second PT 170. When the access prohibition is set in the second PT 170, the VMM 20 determines that the page exception results from the guest exception and calls the event report part 120. When the access prohibition is not set in the second PT 170, the VMM 20 determines that the page exception results from a privileged memory operation, calls an emulator 130, and makes it perform emulation. The emulator 130 changes the shadow PT 140 as necessary.

In recent years, the CPU tends to have added a function of supporting the VMM. Regarding judgment of the necessity of emulation for a page exception, A Page Fault Error Code Mask/Match function and a Nested Paging function as shown in U.S. Pat. No. 6,996,748 are added. The Page Fault Error Code Mask/Match function is a function of selecting an event handler that causes a branch at the time of occurrence of a page exception in conformity with the cause code of the page exception. Using this function, only in the case of a page exception of P-bit violation or R/W-bit violation that has a possibility of requiring emulation, the flow is branched to an event handler 80, and in the case of other page exceptions where emulation is unnecessary, the flow is branched to the second event handler 172, whereby this function makes possible speeding-up.

The Nested Paging function is a function of using the two page tables (PT's) for detection of a page exception and selecting an event handler to which the flow shall be branched at the time of occurrence of a page exception according to the page table that caused the page exception. Using this function, only in the case where the flow violates the setting of the shadow PT that has a possibility of requiring emulation, causes a branch to the event handler 80, and only in the case where the flow violates the setting of the second PT that does not require emulation, the flow is branched to the second event handler 172, whereby this function makes possible speeding-up.

If the x86 compatible CPU is equipped with the page exception detection function using two PT's like the Nested Paging function, the configuration that allows the first OS and the second OS to exist together and a plurality of OS's to be made to operate becomes possible. Below, this configuration will be explained using FIG. 2.

The CPU 60 mounted on a physical machine 10 is equipped with a page exception detecting function 70 using two PT's. The page exception detecting function 70 using two PT's includes the TLB 73 for holding the access approval/disapproval information in each memory area, a PT address register A 74 for holding a memory address of the second PT 170, and a PT address register B 75 for holding a memory address of the shadow PT 140. The VMM 20 constitutes the virtual machine 25. A first OS 30 (30-1) operating on the VMM 20 has a first PT 160 (160-1) and a first event handler 162 (162-1), and sets the access approval/disapproval information in the each memory area in the first PT 160. Moreover, the second OS 40 works on the first OS 30. The second OS 40 operating on the VMM 20 or the first OS 30 has the second PT 170 and the second event handler 172, and sets the access approval/disapproval information in the each memory area in the second PT 170. Furthermore, an application (AP) 50 works on the second OS 40.

The VMM 20 creates the shadow PT 140 to which access prohibition is added to a memory address to be used for hardware operations (privileged memory) using the P-bit and a R/W-bit by referring to the first PT 160, and stores it in the PT address register B 75. Moreover, the VMM 20 stores an address of the second PT in the PT address register A 74. The page exception detecting function 70 using two PT's copies a setting of the second PT 170 and the setting of the shadow PT 140 to the TLB 73, and judges a page exception.

When the event handler 80 is called with occurrence of a page exception that violates the setting of the shadow PT 140, the VMM 20 calls a page exception cause code analysis part 90 and a first PT analysis part 110 in order to determine whether the page exception results from an operation of the privileged memory or whether it results from an operation of memory that is specified as access-disapproved by the first PT 160 (the guest exception). The page exception cause code analysis part 90 refers to a cause code passed from the page exception detecting function 70 using two PT's. When there is no violation in both the P-bit and the R/W-bit in the cause code, the VMM 20 determines that the page exception results from the guest exception, and calls the event report part 120. The event report part 120 creates the cause code to be passed to the guest, and causes a branch to the first event handler 162.

Only when there is violation in either the P-bit or the R/W-bit in the cause code, the VMM 20 calls the first PT analysis part 110. The first PT analysis part 110 refers to the first PT 160 and analyzes whether an access-prohibition is set regarding the bit shown by the cause code in the first PT 160. When the access prohibition is set in the first PT 160, the VMM 20 determines that the page exception results from the guest exception, and calls the event report part 120. When the access prohibition is set in the first PT 160, the VMM 20 determines that the page exception results from the privileged memory operation, calls the emulator 130, and makes it perform emulation. The emulator 130 changes the shadow PT 140 as necessary.

Emulation operations described above constitute essentially necessary processing for the VMM. Therefore, performance decrement (overhead) resulting from the emulation is unavoidable. On the other hand, the judgment of the necessity of emulation is essentially unnecessary processing. Therefore, in order to suppress the overhead, it is necessary to enhance the speed of the judgment of the necessity of emulation. In the virtual machine system, the page exception by the P-bit brings about the overhead in processing judgment of the necessity of emulation due to the following reasons.

Generally, in order to realize virtual memory, the OS uses the P-bit of the page table (PT). Especially, at the time of the start of a new process, the P-bit is reset for an extensive memory area, and all the reading/writing is prohibited. After this, whenever the process operates a new memory area, a page exception occurs. With the page exception, the OS secures and allocates memory for the process.

In the case where the second OS is operated on the VMM using a CPU having a page exception detecting function using only one PT, when the second OS executes a process that uses a large amount of memory or the like, the page exception resulting from the guest exception occurs frequently. When the VMM judges the necessity of emulation to this page exception, there is a problem that large overhead occurs along with execution of the cause code analysis part 90 on a page exception that is essentially unnecessary and the second PT analysis part 115.

In the case where a CPU having a page exception detecting function using two PT's is used, when the first OS is operated on the VMM, there is a problem that the overhead becomes large in judging the necessity of emulation because execution of the page exception cause code analysis part 90 and the first PT analysis part 110 cannot be omitted.

In view of the above-mentioned problem, one of objects of the present invention is to provide a virtual machine system capable of suppressing the overhead accompanying emulation, and a control program thereof. Moreover, the present invention aims at compatibility between overhead suppression in the case of operating a program that uses a large amount of memory and overhead suppression in the case of making the first OS operate on the VMM. The above-mentioned and other objects of the present invention and new features will become clear from the description and accompanying drawings of this specification.

Among several aspects of the invention disclosed in this patent application, the outline of a representative aspect will be explained shortly as follows:

A control program that is installed in a virtual machine having one or more x86 compatible CPU's each equipped with a page exception detecting function using two PT's and equipped with memory and that has a function of making a first OS and a plurality of second OS's operate is made to execute the following procedures:

(a) A procedure of creating the shadow PT for prohibiting an operation in the memory area used for a control of the I/O device by utilizing the RSV-bit that is generally not used in the page tables of the first OS and the second OS (always being set to "0"), (b) A procedure of storing a PT of the second OS and the shadow PT in a PT address register A and a PT address register B, respectively, and (c) A procedure of judging the necessity of emulation by referring to the cause code at the time of occurrence of a page exception.

Moreover, when the shadow PT is initialized, the RSV-bit of each entry of the shadow PT is set to nonzero and a use flag showing a RSV use situation in the first PT is reset.

At the time of occurrence of a page exception, when the cause code shows occurrence of the P-bit violation, it is determined that emulation is unnecessary. At the time of occurrence of a page exception, when the cause code shows occurrence of the RSV-bit violation and the use flag has been reset, it is determined that emulation is required. At the time of occurrence of a page exception, when neither of the above-mentioned conditions is satisfied, it is judged whether a memory operation that violates the setting of the first PT was performed by analyzing the first PT controlled by the first OS, and the necessity of emulation is determined. Incidentally, the RSV-bit in the first PT is nonzero when the shadow PT is set by referring to the setting of the first PT in a process of emulation, and the use flag is set.

Briefly explaining an effect that is obtainable by a typical aspect among aspects of the invention disclosed by the present application, when a page exception of the P-bit violation regarding the first PT occurs, the present invention negates the need of analyzing the first PT; therefore, it becomes possible to suppress the overhead.

BRIEF DESCRIPTION OF THE DRAWINGS

FIG. 8 is a diagram showing a format of a cause code at the time of occurrence of a page exception in the case of using Intel64;

FIG. 9 is a diagram showing a configuration example of characteristic data of a first PT in the first embodiment of the present invention;

FIG. 22 is a diagram showing a configuration example of characteristic data of a second PT in the second embodiment of the present invention;

FIG. 31 is a diagram showing a configuration example of the page table (PT) included in the OS in the virtual machine;

FIG. 32 is a diagram showing a configuration example of the shadow PT included in a virtual machine system that is examined as a premise of the present invention; and FIG. 33 is a diagram showing a configuration example of the shadow PT included in the virtual machine system according to one embodiment of the present invention.

DETAILED DESCRIPTION OF THE PREFERRED EMBODIMENTS

Figure 1:
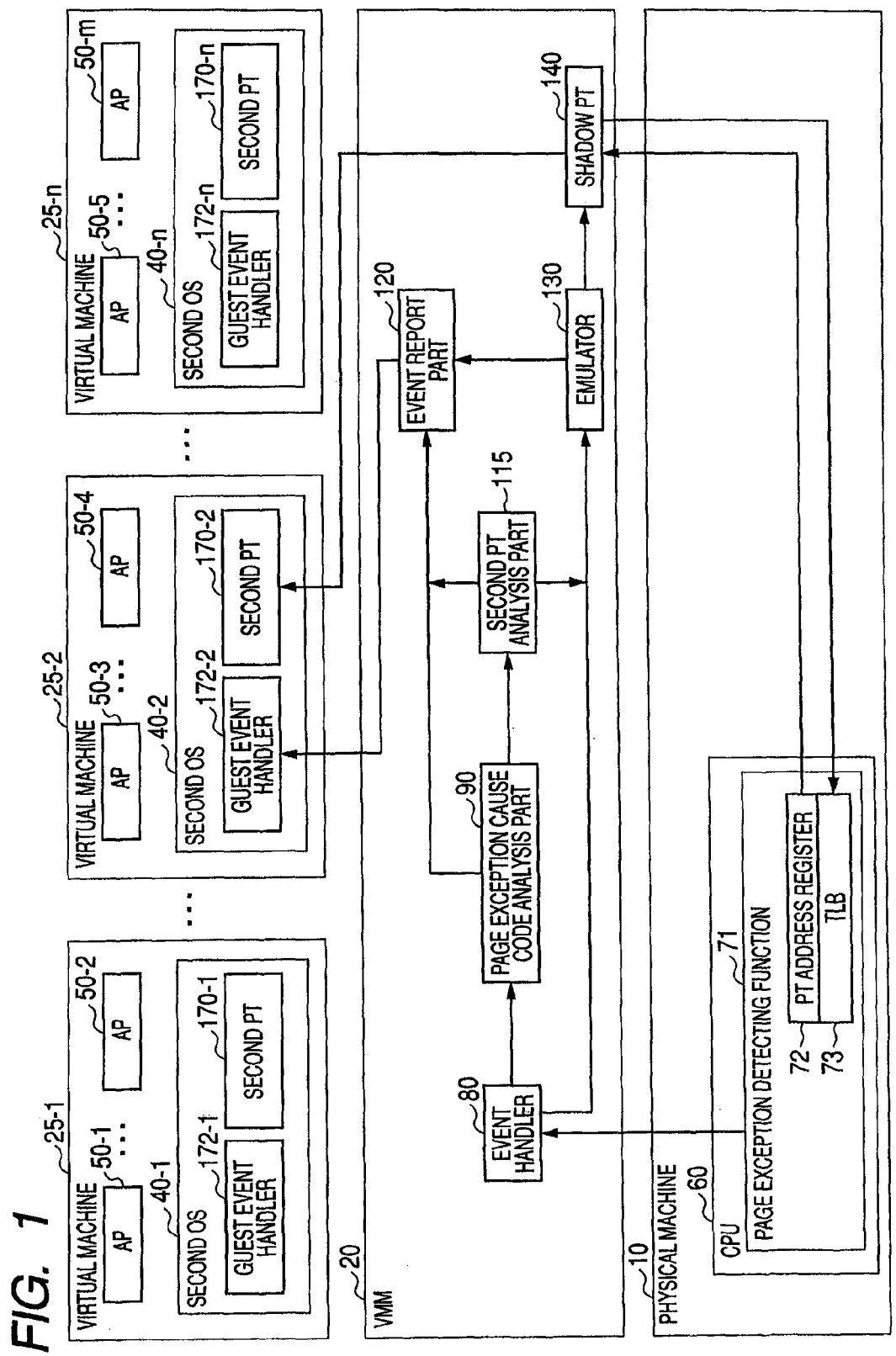
FIG. 1 is a block diagram showing a configuration example of a virtual machine system that is examined as a premise of the present invention.
Figure 2:
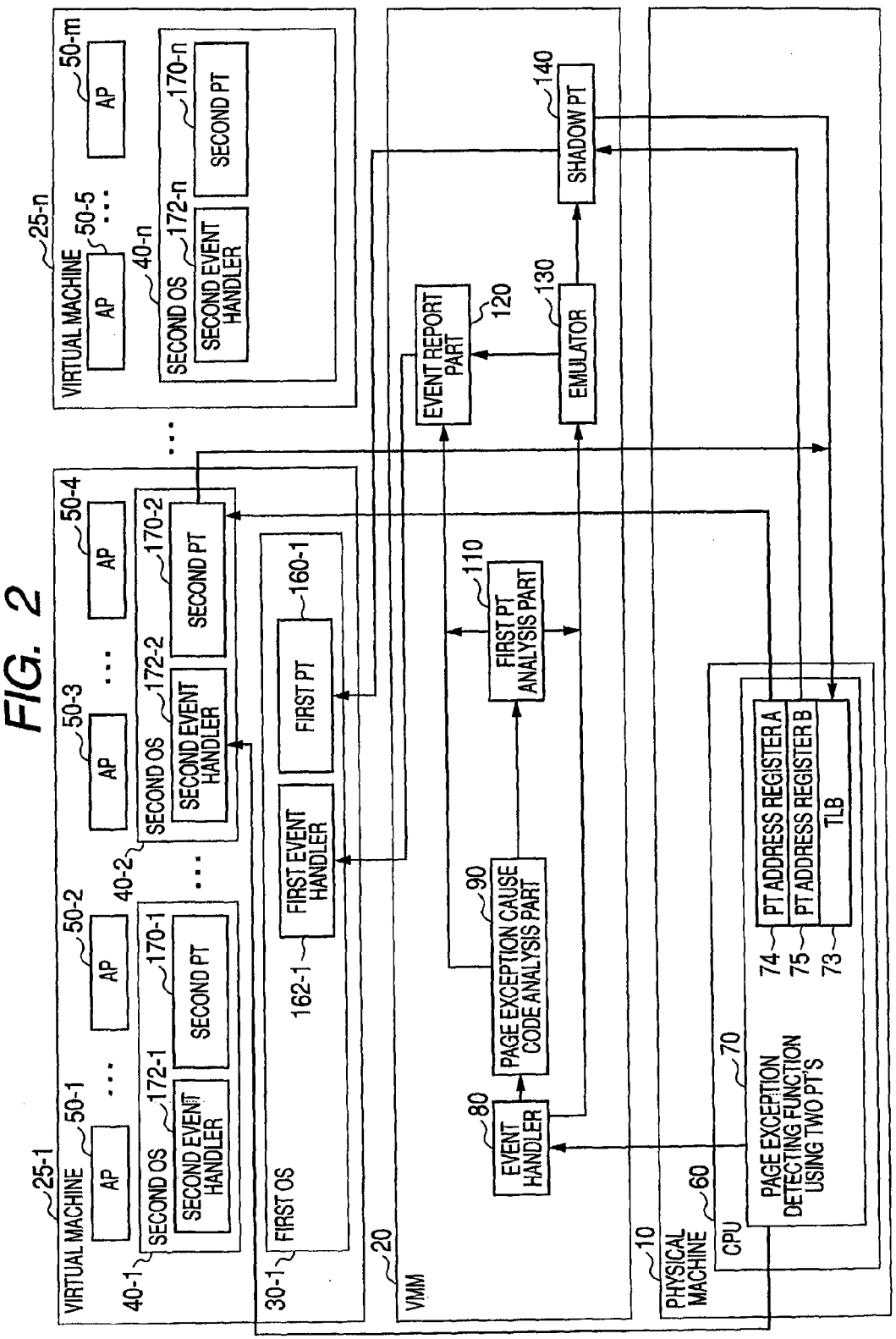
FIG. 2 is a block diagram showing another configuration example of the virtual machine system that is examined as a premise of the present invention.

In the following embodiments, when a number, etc. of elements (including a number, a value, an amount, a range, etc.) is mentioned, except in a case where the number is especially indicated, a case where the number is theoretically clearly limited to a specific number, and like cases, a number shall not be limited to the specific number and it may be above or below the specific number.

Further, in the following embodiments, with regard to the constituent elements (including elemental steps, etc.), excluding a case where they are especially indicated and a case where they are theoretically clearly indispensable, and like cases, it is natural that the constituent elements are not necessarily required. Similarly, in the following embodiments, when mentioning shapes, position relations, etc. of the constituent elements, except in a case where they are especially indicated, a case where it is considered that it is theoretically not so, and like cases, they shall include what are substantially approximate or analogous to the shapes, and the like. This is the same also with respect to the above-mentioned numeric values and ranges.

Hereinafter, embodiments of the present invention will be described in detail below based on the drawings. Incidentally, in all the diagrams for explaining the embodiments, the same members are principally given the same numerals, and repeated explanations of them will be omitted.

Enhancing the speed of judgment of necessity of emulation by utilizing the reserved (RSV) bit on a shadow PT in the virtual machine monitor (VMM) is one of main features of the virtual machine system of this embodiment. First, the outline of this feature will be explained below, and detailed configuration examples, operation examples, etc. will be explained in embodiments after that.

FIG. 31 is a diagram showing a configuration example of a page table (PT) included in the OS in the virtual machine.

FIG. 32 is a diagram showing a configuration example of the shadow PT included in the virtual machine system that was examined as a premise of the present invention.

FIG. 33 is a diagram showing a configuration example of the shadow PT included in the virtual machine system according to one embodiment of the present invention. For example, for convenience, giving an explanation using a configuration example of FIG. 1, FIG. 31 corresponds to a second PT 170 included in a second OS 40 of a virtual machine 25 and FIGS. 32 and 33 correspond to a shadow PT 140 in a VMM 20.

The page tables of FIGS. 31 to 33 have the same format, respectively, and each of them defines a start address 1114, a reserved bit (RSV) 1119, a P-bit 1116, etc. of a page that is an access target for each of a plurality of page entries. Each start address 1114 includes an address corresponding to the memory, an address (MMIO address) corresponding to an I/O device, etc.

First, as shown in FIG. 31, in the second PT 170, a value of the P-bit 1116 is set up, for example, in order to control virtual memory, etc. For example, when the value of the P-bit 1116 is "1," it means that the page exists on a physical memory; conversely, when it is "0," it means that the page does not exist on the physical memory, but exists in an external storage, etc. Therefore, when the P-bit is "0," it is necessary to perform handling of a page exception. In the example of FIG. 31, the P-bit of a page entry such that "0x00000000" is set in the start address 1114 is "0," and, accordingly, when the second OS 40 accesses the page, handling of a page exception becomes necessary.

Here, as shown in FIG. 32, the shadow PT 140 in the virtual machine system that was examined as a premise of the present invention has a structure such that the page table of FIG. 31 is copied and further the P-bit 1116 of the page entry corresponding to the MMIO address is rewritten to "0." A CPU 60 of a physical machine 10 of FIG. 1 detects a page exception by referring to the shadow PT 140 of this FIG. 32. Therefore, when the second OS 40 accesses the MMIO address, a page exception detecting function 71 of the CPU 60 detects a page exception based on the P-bit (="0") of the shadow PT 140, and a cause code of this page exception is notified to the VMM 20, whereby it becomes possible to make the VMM 20 perform emulation of I/O access.

The case where the page exception detecting function 71 detects a page exception includes, in addition to a case where P-bit violation occurs accompanying an access to this MMIO address, also a case where the P-bit violation occurs resulting from the second PT (in the example described above, a case where the second OS accesses a page whose start address is "0x00000000"). In the former case, it is necessary to perform emulation; in the latter case, it is necessary to notify a guest event handler 172 of the second OS 40 of the event. In order to discriminate whether the page exception is the former P-bit violation or the latter P-bit violation, the VMM 20 must refer to the content of the second PT 170 using a second PT analysis part 115, and the VMM 20 can judge the necessity of emulation using this discrimination result. However, such discrimination processing has a large overhead and will cause degradation in operation efficiency.

In order to solve this problem, the shadow PT 140 as shown in FIG. 33 is used in the virtual machine system of this embodiment. The shadow PT 140 of FIG. 33 is configured such that the page table of FIG. 31 is copied and further the reserved bit (RSV-bit) 1119 of the page entry corresponding to the MMIO address is rewritten to nonzero (="1"). If the page exception detecting function 71 of the CPU 60 is equipped with a function of, in the case where this reserved bit 1119 is "1," detecting a page exception that is different from the P-bit violation, when an access to the MMIO address occurs, it becomes possible to make the VMM perform the emulation without analyzing the second PT 170. Moreover, also when the P-bit violation accompanying the second PT 170 occurs, it is possible to notify the guest event handler 172 of the second OS 40, without analyzing the second PT 170. With such capability, it is possible to make small the overhead accompanying the emulation and to realize improvement in operation efficiency.

Incidentally, in the explanation thus far given, the case where the reserved bit 1119 is not used (that is, fixed to "0") in the second PT 170 was assumed. Usually, it is thought that such an assumption stands in almost all the cases. However, depending on specifications of the second OS 40, etc., it can be hypothesized that the reserved bit 1119 is used in the second PT 170 for some purpose. In the virtual machine system of this embodiment, it is desirable that, assuming such a case, the system has on the VMM 20 a function of controlling a use history of the reserved bit 1119 in the second PT 170.

That is, if the reserved bit 1119 of the second PT 170 has not been used, what is necessary is just to perform the emulation without analyzing the second PT 170 upon acceptance of "1" of the reserved bit 1119 in the shadow PT 140, as described above. On the other hand, if the reserved bit 1119 of the second PT 170 has been used, what is necessary is just to analyze the content of the second PT 170, and then to discriminate whether the page exception is a reserved-bit violation resulting from the second PT 170 or a reserved-bit violation resulting from the access to the MMIO address.

Although, the overhead will be generated in doing so, even if the reserved bit 1119 is used (namely, being set to "1") in the second PT 170, its frequency is expected to be very low compared with a frequency (namely, frequency of being set to "0") by which the P-bit is used with a control of the virtual memory. In other words, it is expected that a memory area where access is prohibited by the reserved bit 1119 of the second PT 170 is very much narrower than the memory area where access is prohibited by the P-bit of the second PT 170. Therefore, it is thought that the overhead is smaller than that of the case where the cause of the P-bit violation is broken down as shown in FIG. 32.

In the virtual machine system of this embodiment, when creating the shadow PT 140, it is desirable to set the reserved bit 1119 of each page entry in the shadow PT 140 of the initial state to "1." Then, when the second OS 40 performs page access based on the second PT 170, since the reserved bit 1119 of the shadow PT 140 is "1" in its initial state, a page exception occurs. Considering this, the VMM 20 accepts this page exception and creates the page entry corresponding to the page access that is a target (namely, corresponding to the copy of the target page entry in the second PT 170) in the shadow PT 140. In doing this, if the page access does not require emulation, what is necessary is just to rewrite the reserved bit of the page entry created in the shadow PT 140 to "0" and to copy the value of the second PT 170 to the value of the P-bit so that it has the same value. Since this makes it possible to copy only a part of a plurality of page entries that the second OS 40 actually used for the page access in the second PT 170 to the shadow PT 140, it becomes possible to reduce the memory capacity necessary for the shadow PT 140.

Hereafter, a virtual machine system including such a feature and its control program will be explained in a detailed example of configuration and an operation example. Moreover, features other than those that have been explained so far will become clear from the following embodiments.

First Embodiment

<1. Hardware Configuration>

Figure 3:
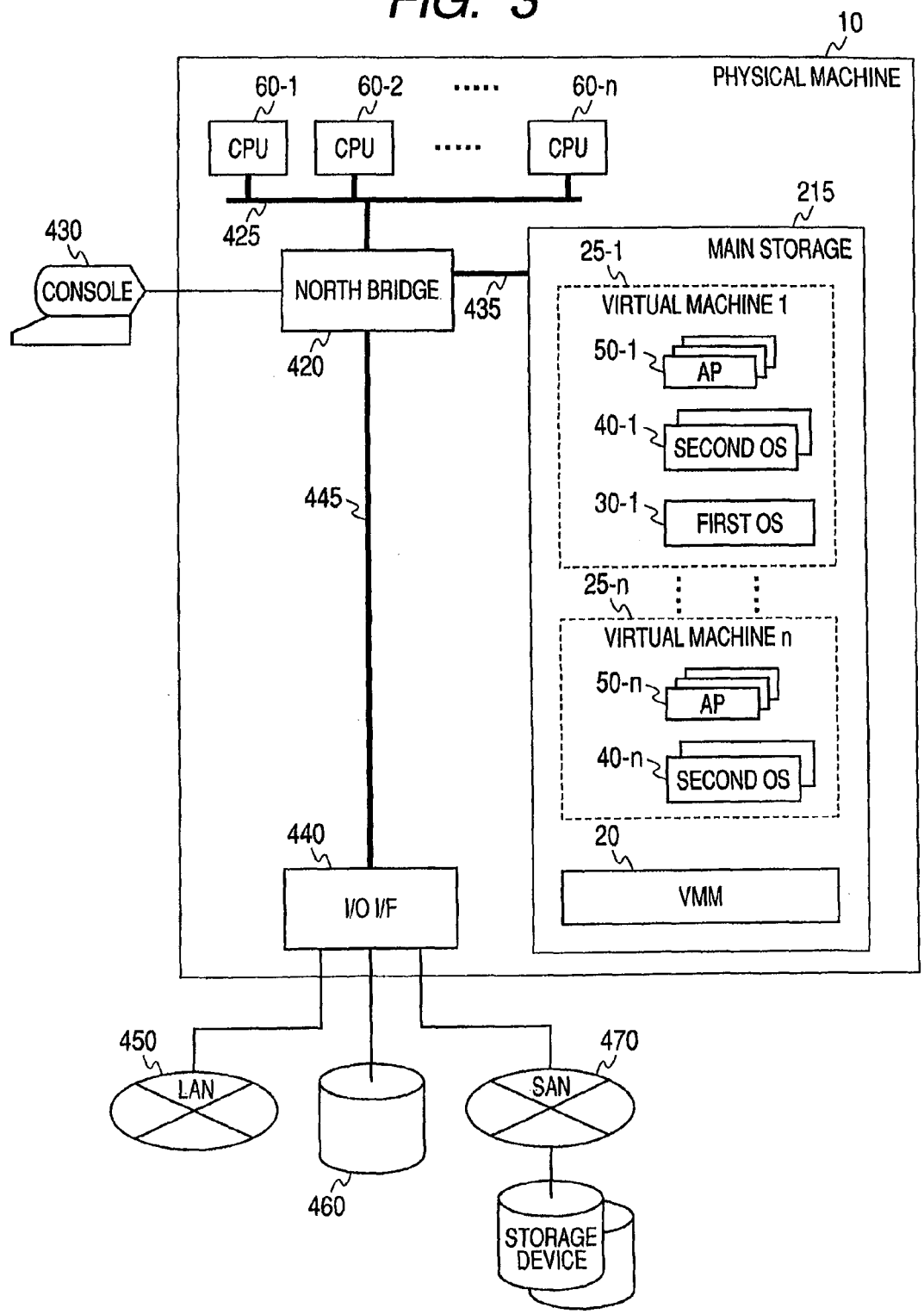
FIG. 3 is a schematic diagram showing a hardware configuration example of the virtual machine system in a first embodiment of the present invention.

FIG. 3 is a schematic diagram showing a hardware configuration example of a virtual machine system in a first embodiment of the present invention. The virtual machine system shown in FIG. 3 includes the physical machine 10 and other various peripheral devices. The physical machine 10 has one or more CPU's 60 (60-1 to 60-*n*), and these CPU's 60 are connected to a north bridge 420 (or memory controller) through a front side bus 425.

A main storage 215 is connected to the north bridge 420 through a memory bus 435, and an I/O interface 440 is connected to it through a bus 445. The I/O interface 440 includes a network adapter connected to a LAN 450, a SCSI adapter connected to a disk device 460, etc., a fiber channel adapter connected to an SAN 470 (Storage Area Network), etc, and is connected to the I/O devices.

The CPU 60 accesses memory through the north bridge 420, accesses the I/O devices through the I/O interface 440 from the north bridge 420, and performs predetermined processing. Incidentally, the north bridge 420 controls the main storage 215, and is connected to a console 430 including a graphic controller, so that it can display an image.

The virtual machine monitor (VMM) 20 is loaded to the main storage 215, and the virtual machine 25 realized by this VMM 20 executes a first OS 30 or the second OS 40. The first OS 30 executes an arbitrary second OS on the virtual machine 25. Moreover, the second OS executes an arbitrary application (AP) 50 on the virtual machine 25.

<2. Software Configuration>

Figure 4:
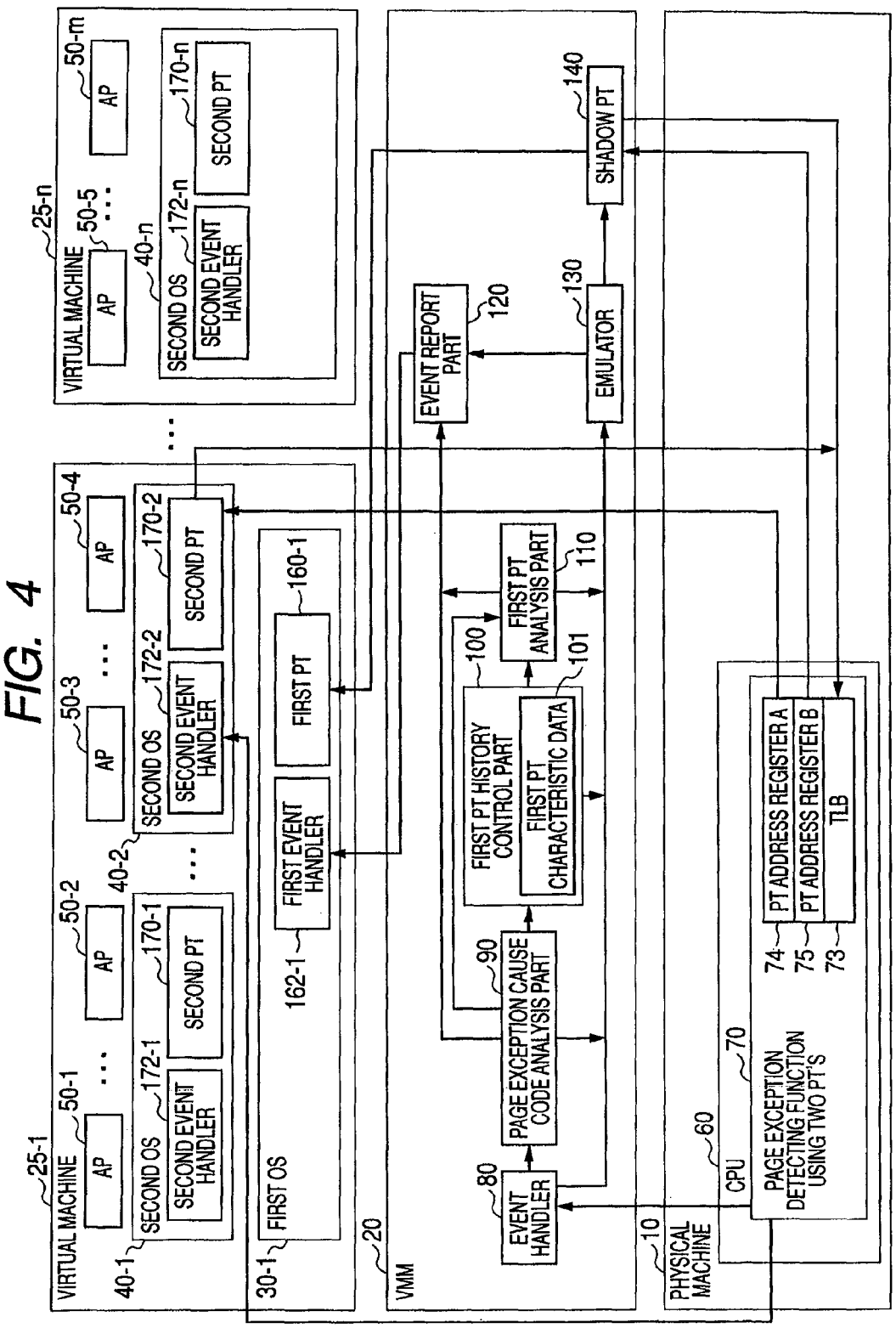
FIG. 4 is a block diagram showing a configuration example of principal parts of software and hardware of the virtual machine system in the first embodiment of the present invention.

Next, a principal part of a software configuration that realizes the virtual machine 25 on the physical machine 10 will be explained in detail, referring to FIG. 4.

On the physical machine 10, the VMM 20 for controlling a plurality of virtual machines 25 is operating. In the each virtual machine 25, one or more of the first OS's 30 or the second OS's 40 operate. The one or more of the second OS's 40 operate on the first OS 30. Moreover, one or more of applications (AP's) 50 operate on the second OS 40.

The VMM 20 has: the shadow PT 140 that defines access approval/disapproval in each memory area for each of the first OS's 30; an emulator 30 for emulating a hardware operation by the guest; an event report part 120 for reporting an event, such as a page exception, to the first OS 30; an event handler 80 for handling an event that has occurred in the CPU 60; a page exception cause code analysis part 90 for analyzing an occurrence cause of an event by referring to the cause code passed to the event handler 80 at the time of occurrence of the page exception; a first PT history control part 100 for holding an access prohibition setting history of the memory area by the RSV-bit in a first PT 160 that the first OS 30 holds; and a first PT history analysis part 110 for analyzing whether a memory operation generating a page exception violates a setting of the first PT.

The shadow PT 140 has an entry such that the RSV-bit is set to nonzero for prohibiting all the reading/writing of the MMIO (Memory Mapped I/O) memory address that is used to control the I/O device. In order to disable writing at a memory address at which the first PT 160 exists, the shadow PT 140 has an entry in which an R/W-bit is set to 0. Moreover, in order to disable reading/writing by the guest for a part or the whole of the memory area not yet operated, the shadow PT 140 has an entry that the RSV-bit is set to nonzero or the R/W-bit is set to 0. For the memory areas corresponding to neither of them, a setting that inherits the access approval/disapproval specified in the first PT 160 is held.

An emulator 130 emulates hardware operations by the guest. When the emulator 130 emulates an operation with respect to the first PT 160, the corresponding shadow PT 140 is updated in conformity with the setting of the guest. Moreover, when the emulator 130 detects occurrence of an event with respect to the guest, the event report part 120 is called. In order to report an event, such as a page exception, to the first OS, the event report part 120 creates states of the memory and the CPU immediately after the event occurrence, and causes a branch to a first event handler 162 that the first OS 30 has.

The event handler 80 is called when the CPU 60 detects events, such as a page exception, and the flow is branched to a code in the VMM 20 in conformity with the kind of the event. The page exception cause code analysis part 90 classifies crudely a factor of the page exception from the cause code being passed at the time of occurrence of the page exception, and determines a code to be executed next based on the crudely classified factor. When the page exception results from the P-bit violation, the event report part 120 is called. When the page exception results from the RSV-bit violation, the first PT history control part 100 is called. When there is a possibility that the page exception results from R/W-bit violation, the first PT analysis part 110 is called. When the page exception corresponds to none of the above mentioned, the event report part 120 is called.

The first PT history control part 100 holds the characteristic of the first PT 160 in characteristic data 101 of the first PT. The first PT characteristic data 101 controls a format of the first PT 160 and existence of a history that all the reading/writing regarding the memory area were prohibited by setting the RSV-bit to nonzero in the first PT. When there is no history that the RSV-bit became nonzero in the first PT, the first PT history control part 100 calls the emulator 130; when there is a history that the RSV-bit became nonzero in the first PT, it calls the first PT analysis part 110.

In the setting in the first PT 160, the first PT analysis part, 110 analyzes whether the cause code passed to the event handler 80 at the time of occurrence of a page exception can arise, and determines a code to be executed next. When the cause code passed to the event handler 80 at the time of occurrence of a page exception can arise in the setting in the first PT 160, the event report part 120 is called; when a page exception cannot arise, the emulator 130 is called.

The physical machine 10 has the x86 compatible CPU 60 and the CPU 60 has a page exception detecting function 70 using two PT's. The page exception detecting function 70 using two PT's has a TLB 73, a PT address register A 74, and a PT address register B 75. The TLB 73 holds approval/disapproval of access to the memory area. The PT address register A 74 holds a start address of the second PT 170. The PT address register B 75 holds a start address of the shadow PT 140. A setting of the access approval/disapproval in the second PT 170 and a setting of the access approval/disapproval in the shadow PT 140 are copied to the TLB 73.

When a memory operation prohibited by the second PT 170 is detected, the page exception detecting function 70 using two PT's holds its cause code and a memory address of its operation target, and causes a branch to the second event handler 172. On the other hand, when a memory operation prohibited by the shadow PT 140 is detected, it holds its cause code and a memory address of its operation target, and causes a branch to the event handler 80. For memory operations prohibited by none of the second PT 170 and the shadow PT 140, the memory operation is permitted.

The first OS 30 has the first PT 160 and the first event handler 162, and makes one or more second OS's operate. The second OS 40 has the second PT 170 and the second event handler 172, and makes one or more AP's 50 operate. The second OS may directly operate on the VMM 20 or may operate on the first OS 30.

Figure 5:
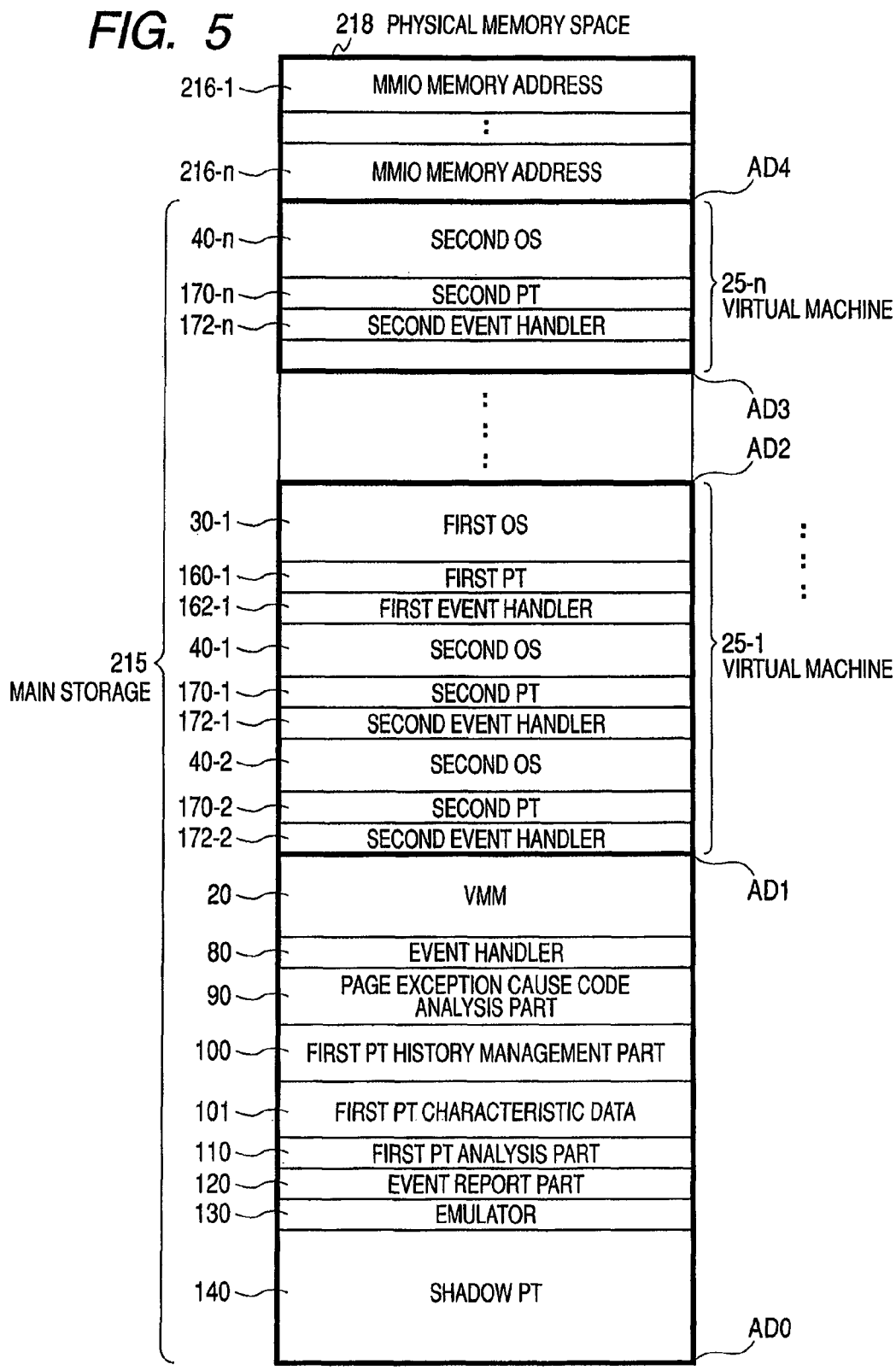
FIG. 5 is a diagram showing one example of a memory map of a main storage in the first embodiment of the present invention.

FIG. 5 is a diagram showing one example of a physical memory space 218 that the VMM 20 controls. The physical memory space 218 includes the main storage 215 and an MMIO address 216 (216-1 to 216-n). The VMM 20 allocates where the memory area is placed and the memory area that the virtual machine 25 uses on the main storage 215. For example, as shown in FIG. 5, the VMM 20 allocates addresses AD0-AD1 to itself, allocates addresses AD1-AD2 to a virtual machine 25-1, and allocates addresses AD3-AD4 to a virtual machine 25-n.

The memory area of each virtual machine 25 includes guest PT's (the first PT 160 and the second PT 170) created by the guest OS's (the first OS 30 and the second OS 40) and the guest event handlers (the first event handler 162 and the second event handler 172). In the memory area that the VMM 20 uses, the following are allocated: the event handler 80, the page exception cause code analysis part 90, the first PT history control part 100, the first PT characteristic data 101, the first PT analysis part 110, the event report part 120, the emulator 130, and the shadow PT 140.

Figure 6:
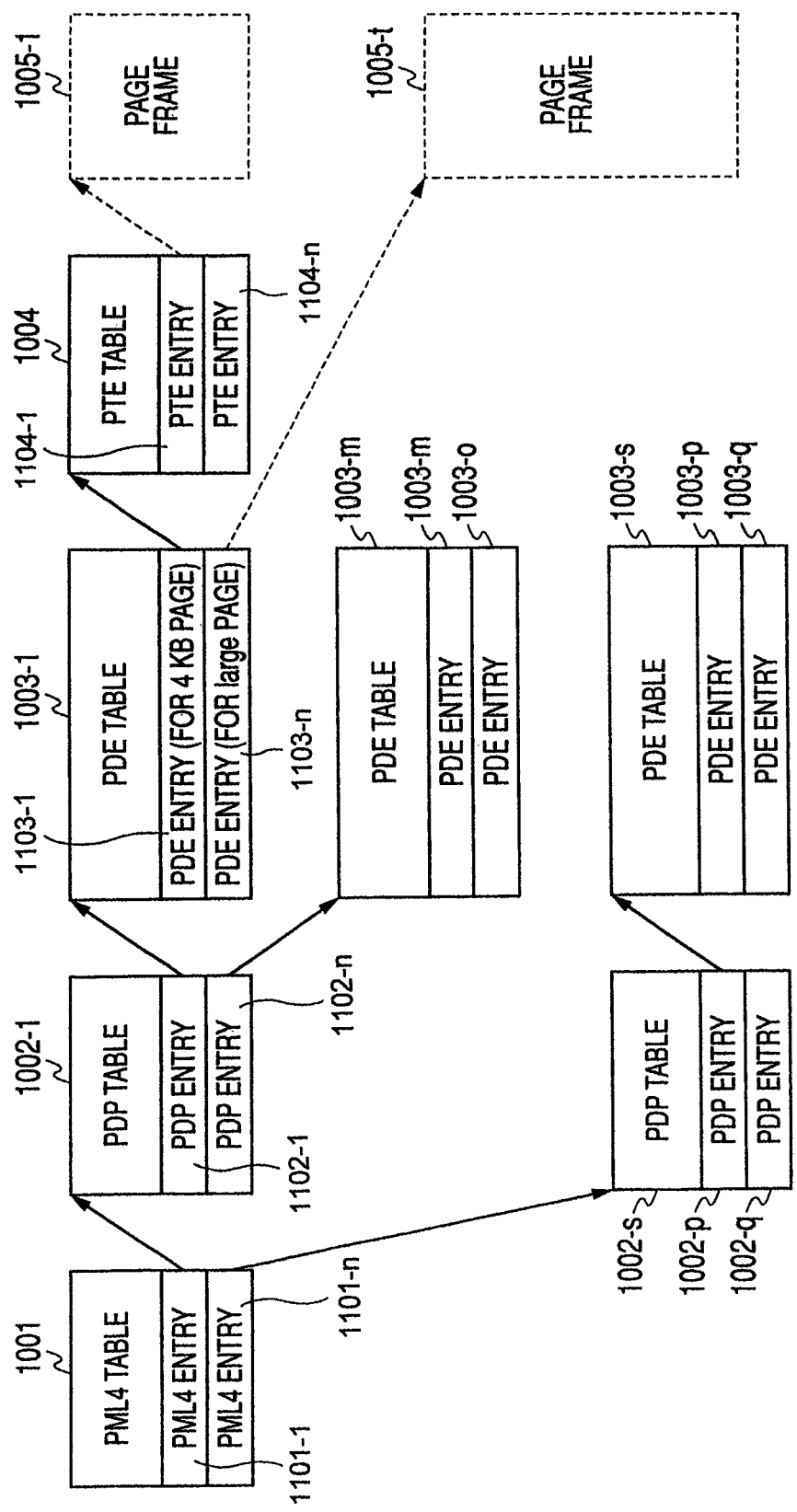
FIG. 6 is a diagram showing a configuration of a page table in the case of using Intel64.

The shadow PT 140, the first PT 160, and the second PT 170 are of the same configuration, and when the CPU 60 works as Intel64, it is constructed as shown in FIG. 6. The configuration of the PT is in the form of four kinds of tables, namely, a PML4 (Page Map Level 4) table 1001, a PDP (Page Directory Pointer) table 1002 (1002-1 to 1002-s), a PDE (Page Directory Entry) table 1003 (1003-1 to 1003-s), and a PTE (Page Table Entry) table 1004, that are connected with one another with pointers. Moreover, the PDE 1003 or PTE 1004 is connected with a page frame 1005 (1005-1 to 1005-*t*) that is a part of the physical memory space 218 with a pointer.

The PML4 table 1001 assumes a higher rank than the PDP table 1002 in a page conversion hierarchy where a virtual address space and a physical address space are converted therebetween, and each PML4 entry 1101 (1101-1 to 1101-*n*) designates a PDP table 1002. The PDP table 1002 is ranked in a higher position than the PDE table 1003, and each PDP entry 1102 (1102-1 to 1102-*q*) designates a PDE table 1003. In the PDE table 1003, each PDE entry 1103 (1103-1 to 1103-*q*) designates a PTE table 1004. Then, in the PTE table 1004, each PTE entry 1104 (1104-1 to 1104-*n*) designates a page frame 1005. Incidentally, in the case where there is a PSE (Page Size Extension) that is a function of the x86 compatible CPU, when a PS-bit of an entry (PDE) of the PDE table 1003 is set, the PDE entry 1103 will designate a page frame directly.

Figure 7:
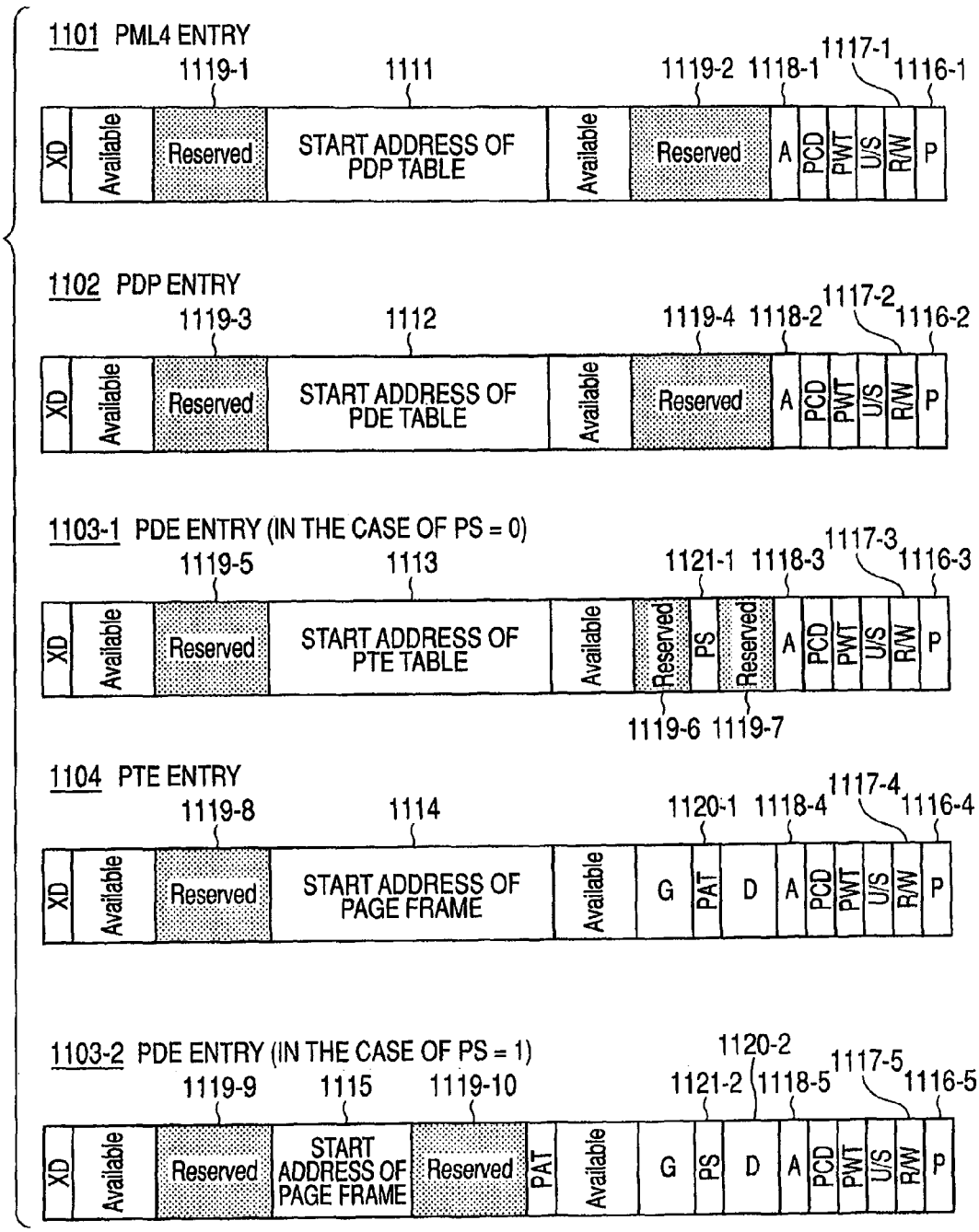
FIG. 7 is a diagram showing a format of an entry of the page table in the case of using Intel64.

FIG. 7 shows the format of each entry related to the PT in the case where the CPU 60 works as Intel64. The PML4 entry 1101 specifies the kind of access to be prohibited for a 512-Gbyte memory area. Similarly, the PDP entry 1102 adds kinds of accesses each of which is prohibited in each 1-Gbyte memory area for the access approval/disapproval specified by the upper-ranking PML4 entry. The PDE entry 1103 adds kinds of accesses each of which is prohibited in each 2-Mbyte memory area for the access approval/disapproval specified by the upper entry. The PTE entry 1104 adds kinds of accesses each of which is prohibited in each 4-Kbyte memory area for the access approval/disapproval specified by the upper entry.

In each entry, there exist address fields (1111, 1112, 1113, 1114, and 1115) each of which designates a start of a lower-ranking table or page. In each entry, there exist a P-bit 1116 (1116-1 to 1116-5) specifying valid/invalid of an entry, at least one RSV-bit 1119 (1119-1 to 119-10) reserved for future expansion, and an R/W-bit 1117 (1117-1 to 1117-5) specifying approval/disapproval of writing. If the P-bit 1116 is set to 0, when information of the entry is read into the TLB 73, namely when operating the memory area corresponding to each entry, a page exception will occur. If an RSV-bit 1119 is set to nonzero, when information of the entry is read into the TLB, that is, when operating the memory area corresponding to the each entry, a page exception occurs. If the R/W-bit 1117 is set to 0, when performing writing in the memory area corresponding to the entry, a page exception occurs.

Formats of a PML4 entry 1101, a PDP entry 1102, and the PTE entry 1104 are one kind. Regarding the PDE entry 1103, two kinds of formats (1103-1, 1103-2) exist depending on a setting of a PS-bit 1121 (1121-1 and 1121-2).

In each entry, an A-bit 1118 (1118-1 to 1118-5) showing a history of access exists. The A-bit changes to 1 when reading/writing to the corresponding memory area is performed. Similarly, a D-bit 1120 (1120-1 and 1120-2) indicating a writing history exits in the PTE entry 1104 and in a PDE entry 1103-2 in the case of PS=1. The D-bit changes to 1 when writing in the corresponding memory area is performed. In addition, regarding a PT in the case where the CPU 60 works as a Non-Intel 45 (IA-32), almost the same format as that of FIG. 7 is specified.

Setup values of the shadow PT 140 and of the first PT 160 are different from each other in the address fields (1111, 1112, 1113, 1114, 1115), the RSV-bit (s) 1119, and the R/W-bit 1117. The VMM 20 sets the address fields (1111, 1112, 1113, 1114, and 1115) of the shadow PT 140 in conformity with the memory space allocated to the virtual machine 25. Moreover, in order that the VMM 20 may detect updating of an entry of the first PT 160 done by the guest regarding the first PT 160 correlated with the shadow PT 140, the R/W-bit of the shadow PT 140 used for the entry updating of the first PT 160 is set to 0 to perform write protection. In order that the VMM 20 may prohibit reading/writing for the MMIO address used for a control of the I/O device, the VMM 20 sets the P-bit 1116 of the shadow PT 140 to 1, and sets the RSV-bit(s) 1119 to nonzero.

Moreover, for the memory area corresponding to an entry in which the A-bit 1118 is 0 in the first PT 160, in order to emulate an update operation of the A-bit 1118 of the first PT 160, the VMM 20 sets the P-bit 1116 of the shadow PT 140 to 1 and sets the RSV-bit(s) to nonzero. Furthermore, in order to emulate an update operation of the D-bit 1120 of the first PT 160 for the memory area corresponding to an entry in which the D-bit 1120 is 0 in the first PT 160, the VMM 20 sets the R/W-bit 1117 of the shadow PT 140 to 0.

FIG. 8 shows the format of the cause code created at the time of occurrence of a page exception. The cause code includes a reserved field 1250, an I/D field 1240, an RSVD field 1230, a U/S field 1220, a W/R field 1210, and a P field 1200. The reserved field 1250 is reserved for the future and does not show useful information. The I/D field 1240 is set to 1 only when a page exception occurs during reading of an instruction. The RSVD field 1230 is set to 1 only when operating the memory area where the RSV-bit (or bits) 1119 is set to nonzero. The U/S field 1220 is set to 1 only when a page exception occurs during execution of the AP 50. The W/R field 1210 is set to 1 only when a page exception occurs at the time of writing in memory. The P field 1200 is set to 1 only when operating the memory area where the P-bit 1116 is set to 0.

FIG. 9 shows the format of the characteristic data 101 of the first PT. The characteristic data 101 of the first PT is a table that is made up of an entry consisting of a guest number 1300, a first PT address 1310, a first PT format 1315, and a reserved-bit use history 1320. The guest number 1300 is a number by which the virtual machine 25 is identified. The address 1310 of the first PT is a start memory address of the first PT 160. The format 1315 of the first PT is an identifier by which the PT format is differentiated. The reserved-bit use history 1320 is a variable that becomes 1 only when a RSV-bit is set to nonzero at least once in the first PT.

<3. Shadow PT Operation by VMM>

Next, one example of a shadow PT operation that the VMM performs in conformity with an operation of the guest will be explained below by referring to a flowchart.

<3.1. Outline of Shadow PT Operation by VMM>

Figure 10:
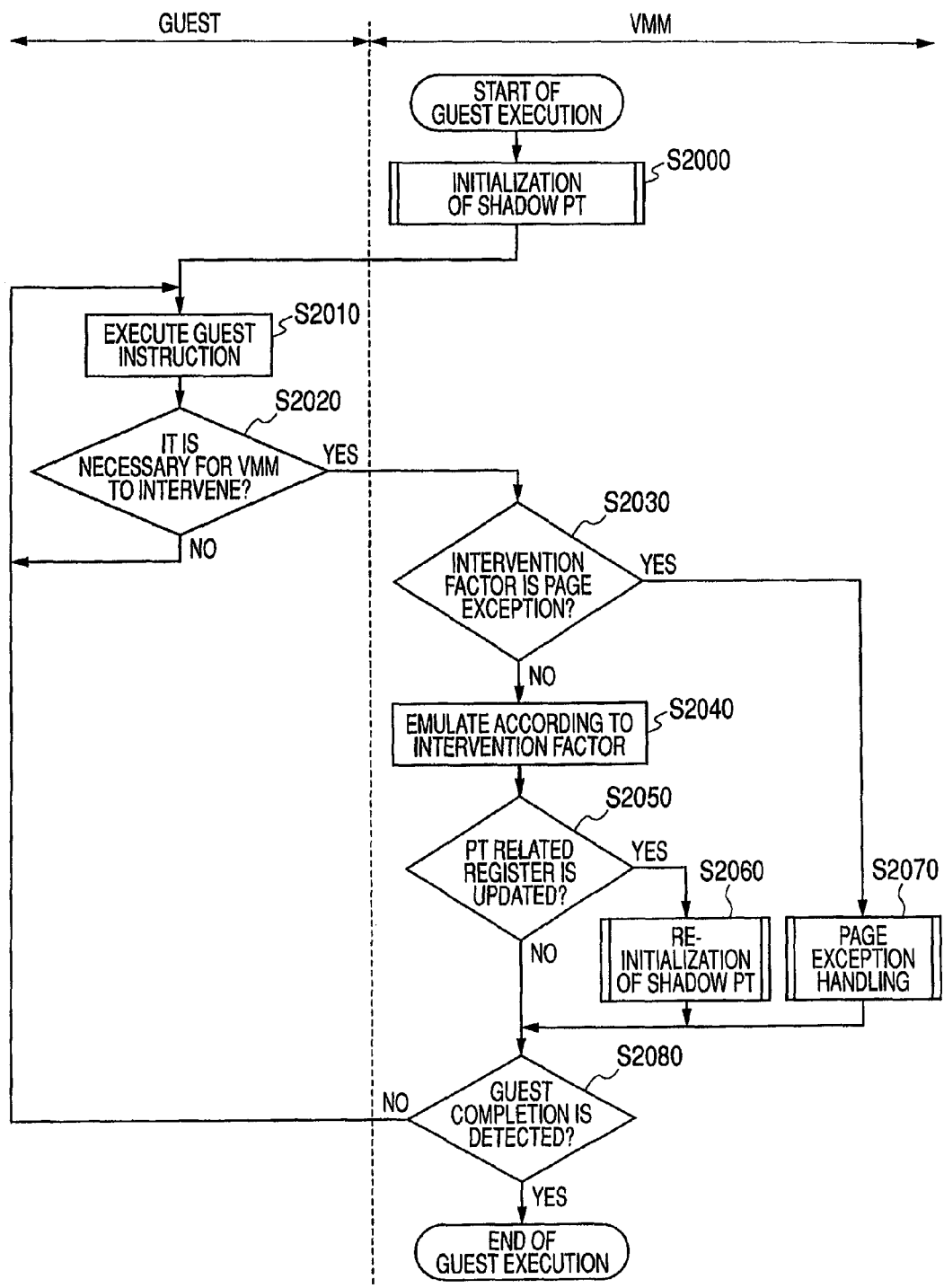
FIG. 10 is a flowchart showing one example of a general description of operations of a guest and a VMM in the first and second embodiments of the present invention.

FIG. 10 is a flowchart showing the overall processing when executing the guest on the VMM 20; the right-hand side of the dashed line in the figure shows processing that the VMM 20 performs, and similarly, the left-hand side of the dashed line shows processing that the guest performs.

In Step S2000, the VMM 20 accepts the guest's execution start demand, and initializes the shadow PT 140 in conformity with an initial state of the virtual machine 25. Then, the VMM 20 writes an address of the shadow PT 140 in the PT address register B 75 of the CPU 60, and subsequently passes a control to the guest OS.

In Step S2010, the CPU 60 executes the guest.

In Step S2020, the guest judges whether an event that needs intervention of the VMM 20 occurred. That is, when there is an event that needs intervention of the VMM 20, such as an interruption, an exception event, and a termination of the guest, the flow proceeds to Step S2030, and control is passed to the VMM 20. When the intervention of the VMM 20 is unnecessary, the flow proceeds to Step S2010 and processing of the guest side is executed. In doing this judgment, a VMM support function, such as VT-x and AMD-V, may be used.

In Step S2030, the VMM 20 analyzes the kind of event, and judges whether an intervention factor is a page exception. When the intervention factor is a page exception, the flow proceeds to Step S2070; when the factor is not a page exception, the flow proceeds to Step S2040.

In Step S2040, for intervention factors other than the page exception, corresponding emulation is performed.

In Step S2050, the VMM 20 detects whether a register relevant to the first PT is updated. In the x86 compatible CPU, there are registers for specifying the PT format and an address, such as CR0, CR3, CR4, and IA32EFER. When the VMM 20 detects updating of CR0, CR3, CR4, and IA32EFER done by the guest, the VMM 20 updates an entry corresponding to the characteristic data 101 of the first PT and lets the flow proceed to Step S2060. In other cases than the above, the flow proceeds to Step S2080.

In Step S2060, accepting change of the first PT format or the first PT address, the VMM reinitializes the shadow PT 140 in conformity with the first PT after the change.

In Step S2070, the factor of a page exception is analyzed, and as necessary, the event is reported to the first OS or emulation is performed. Further, updating of the shadow PT 140 is also performed as necessary.

In Step S2080, the VMM 20 determines the existence of a demand of shutdown of the virtual machine by the guest (termination of the guest). Upon termination of the guest, execution of the guest is terminated. When the demand of termination of the guest has not occurred, the flow proceeds to Step S2010.

By the above-mentioned processing, the VMM 20 enables the shadow PT 140 corresponding to the first PT 160 to continue to hold a state registered in the CPU 60, and can create a page exception to a privileged memory operation by the guest, and emulate memory privileged instruction.

<3.2. Initialization Processing of Shadow PT>

Initialization of the shadow PT performed in Step S2000 of the above-mentioned FIG. 10 will be explained using FIG. 11.

In Step S2100, the VMM 20 initializes each entry of the shadow PT 140. In doing the initialization, the P-bit of each entry is set to 1 and the RSV-bit (s) thereof is (are) set to nonzero.

In Step S2110, for an entry corresponding to the guest number during the initialization in the characteristic data of the first PT, the VMM 20 sets the first PT address to 0, sets the format of the first PT to be without PT, and sets the reserved-bit use history to 0.

In Step S2120, the VMM 20 stores the start address of the initialized the shadow PT 140 in the PT address register B 75 that the CPU 60 has.

<3.3. Reinitialization Processing of Shadow PT>

Reinitialization of the shadow PT performed in Step S2010 of the above-mentioned FIG. 10 will be explained using FIG. 12.

In Step S2200, the VMM 20 reinitializes each entry of the shadow PT 140. In doing the reinitialization, the VMM sets the P-bit of each entry to 1 and sets the RSV-bit(s) thereof to nonzero.

<3.4. Page Exception Handling>

Figure 13:
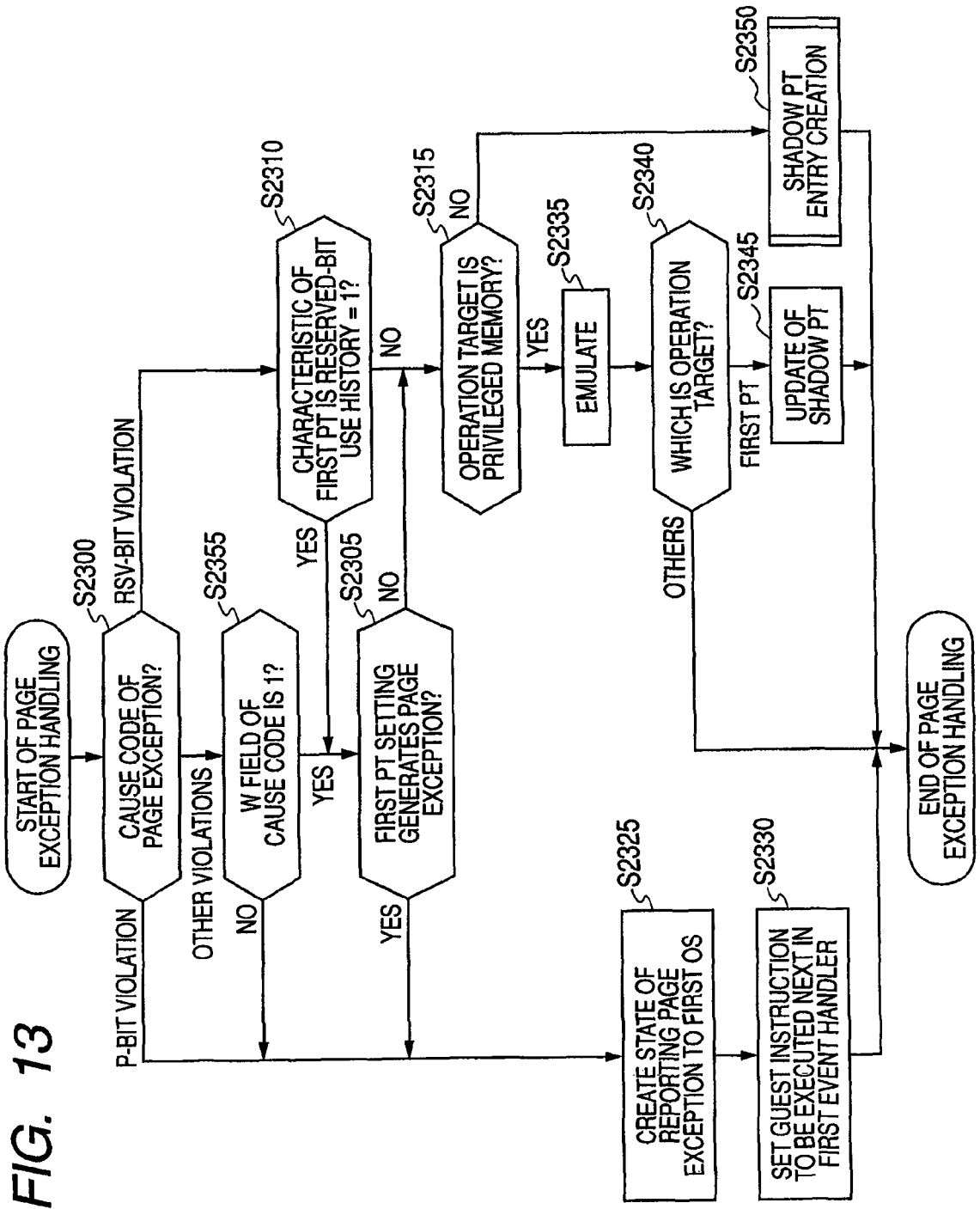
FIG. 13 is a flowchart showing one example of processing of the VMM with respect to a page exception in the first embodiment of the present invention.

Page exception handling performed in Step S2070 of the above-mentioned FIG. 10 will be explained using FIG. 13.

In Step S2300, the P field 1200 of the cause code and the RSVD field 1230 that were passed to the event handler are referred to. When a memory operation that violates the P-bit is performed, namely when the P field is 0, the flow proceeds to Step S2325. When a memory operation that violates the RSV-bit(s) is performed, namely when the RSVD field is 1, the flow proceeds to Step S2310. In other cases than the above, the flow proceeds to Step S2355.

In Step S2355, the W/R field 1210 of the cause code is referred to; when it is 1, the flow proceeds to Step S2305, and when it is 0, the flow proceeds to Step S2325.

In Step S2310, by the characteristic data 101 of the first PT being referred to, a number of the guest in operation and the reserved-bit use history corresponding to the address of the first PT are read. When the reserved-bit use history is 1, the flow proceeds to Step S2305; when the reserved-bit use history is 0, the flow proceeds to Step S2315.

In Step S2305, the VMM analyzes the setting of the first PT and judges whether the setting of the first PT can generates a page exception to the operation target memory address. When the setting of the first PT can generate a page exception, the flow proceeds to Step S2325; when it cannot generate a page exception, the flow proceeds to Step S2315.

In Step S2315, the VMM checks whether the operation target memory address is the privileged memory. When the target is the privileged memory, the flow proceeds to Step S2335; when the target is other than the privileged memory, the flow proceeds to Step S2350.

In Step S2335, the operation of the privileged memory is emulated, and the flow proceeds to Step S2340.

In Step S2340, the classification of the privileged memory that became the operation target is checked; when the operation target is the first PT, the flow proceeds to Step S2345, and when the operation target is not the first PT, the page exception handling is terminated.

In Step S2345, in conformity with updating of the first PT, the entry of the corresponding shadow PT 140 is updated. As means of updating, all the reading/writing of the memory may be prohibited by setting the P-bit to 1 and setting the RSV-bit(s) to nonzero. Alternatively, access permission may be set for a shadow PT entry in a range where any operation to the memory area that requires emulation can be prohibited without becoming contrary to the access approval/disapproval stipulated by the first PT after the update.

In Step S2350, the shadow PT entry is updated in response to a memory operation by the guest.

In Step S2325, states of the CPU resister and of the memory when a page exception is reported to the first OS 30 are created.

In Step S2330, an address of a guest instruction to be executed next is changed to a start address of the first event handler 162.

<3.5. Creation Processing of Shadow PT Entry>

Figure 14:
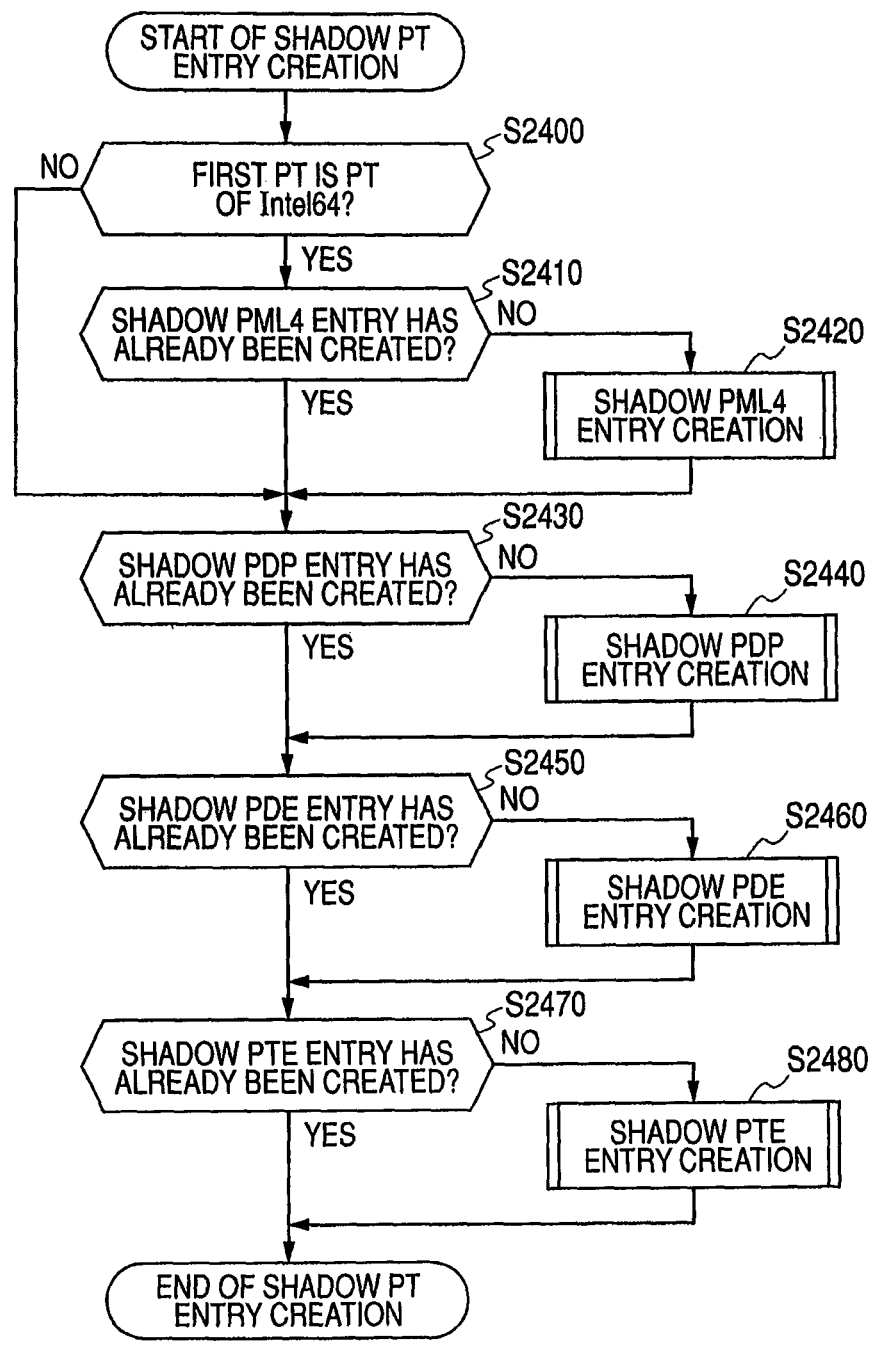
FIG. 14 is a flowchart showing one example of creation processing of the shadow PT entry in the first embodiment of the present invention.

Creation of the shadow PT entry to be performed in Step S2350 in the above-mentioned FIG. 13 will be explained using FIG. 14.

In Step S2400, it is checked whether the format of the first PT is the format for Intel64. If it is the format for Intel64, the flow proceeds to Step S2410; if it is the format for non-Intel64, the flow proceeds to Step S2430.

In Step S2410, in the shadow PT 140, it is checked whether the PML4 entry 1101 corresponding to the memory area where the page exception occurred has already been created. "Having been created" means a state where a memory operation is allowed, and indicates that when page exception arises for reading the memory area, P-bit=1 and RSV-bit=0, and that when a page exception occurs for writing in the memory area, P-bit=1 and RSV-bit=0 and R/W-bit=1.

When the PML4 entry 1101 has been created, the flow proceeds to Step S2430; when it has not been created (uncreated), the flow proceeds to Step S2420.

In Step S2420, the PML4 entry 1101 of the shadow PT 140 corresponding to the memory area where the page exception occurred is changed to an already-created state based on the setting of the first PT 160. In this processing, the PML4 entry 1101 corresponding to a different memory area from the memory area where the page exception occurred may be created, as an addition.

In Step S2430, in the shadow PT 140, it is checked whether the PDP entry 1102 corresponding to the memory area where the page exception occurred has already been created. When the PDP entry 1102 has already been created, the flow proceeds to Step S2450; when not created, the flow proceeds to Step S2440.

In Step S2440, the PDP entry 1102 of the shadow PT 140 corresponding to the memory area where the page exception occurred is changed to an already-created state based on the setting of the first PT 160. In this processing, the PDP entry 1102 corresponding to a different memory area from the memory area where the page exception occurred may be created, as an addition.

In Step S2450, in the shadow PT 140, it is checked whether the PDE entry 1103 corresponding to the memory area where the page exception occurred has already been created. When the PDE entry 1103 has already been created, the flow proceeds to Step S2470; when not created, the flow proceeds to Step S2460.

In Step S2460, the PDE entry 1103 of the shadow PT 140 corresponding to the memory area where the page exception occurred is changed to an already-created state based on the setting of the first PT 160. In this processing, the PDE entry 1103 corresponding to a different memory area from the memory area where the page exception occurred may be created, as an addition.

In Step S2470, in the shadow PT 140, it is checked whether the PTE entry 1104 corresponding to the memory area where the page exception occurred has already been created. When the PTE entry 1104 has already been created, the flow terminates this processing; when not created, the flow proceeds to Step S2480.

In Step S2480, the PTE entry 1104 of the shadow PT 140 corresponding to the memory area where the page exception occurred is changed to an already-created state based on the setting of the first PT 160. In this processing, the PTE entry 1104 corresponding to a different memory area from the memory area where the page exception occurred may be created, as an addition.

Figure 15:
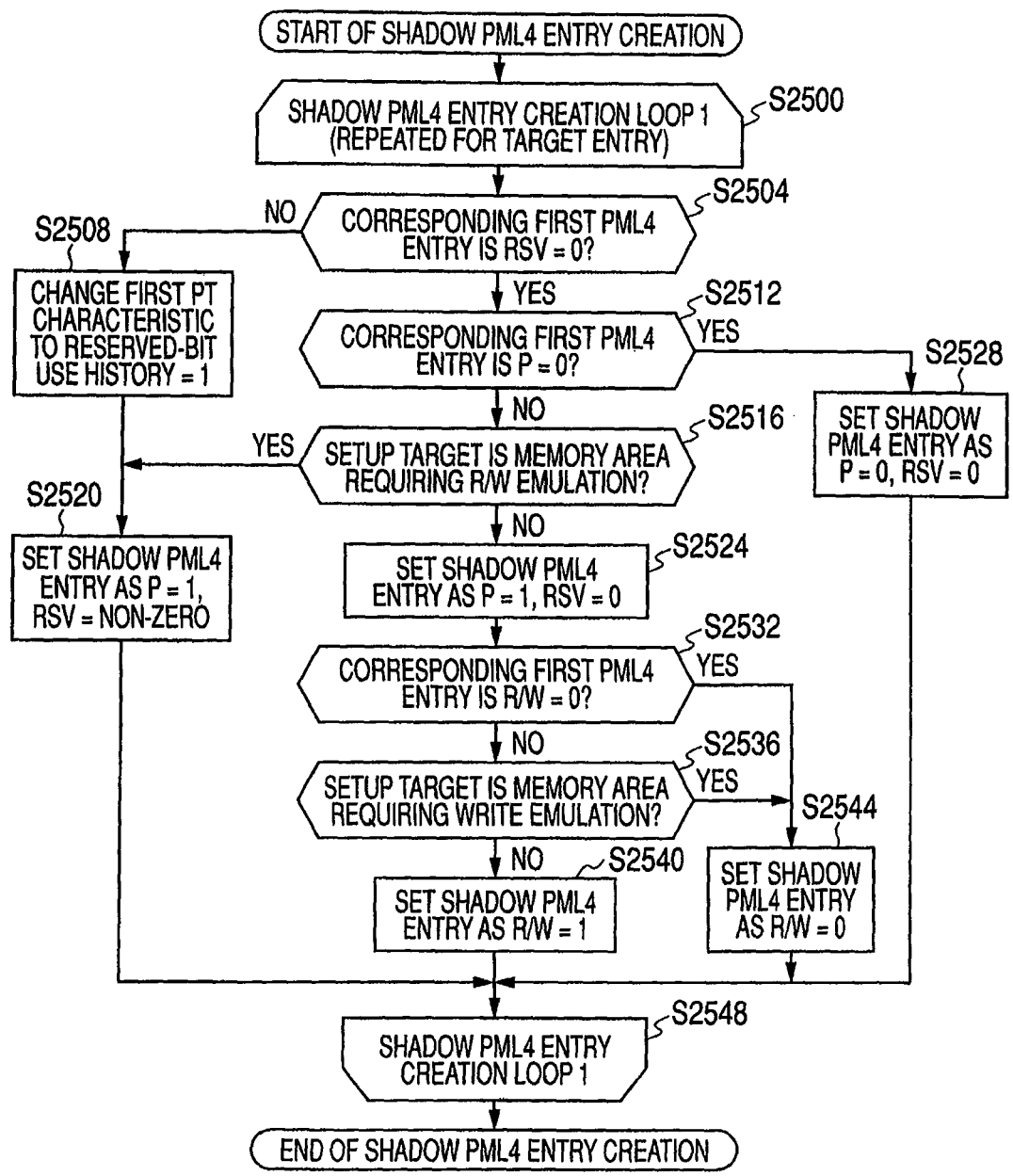
FIG. 15 is a flowchart showing one example of creation processing of a shadow PML4 entry in the first embodiment of the present invention.

Creation of the PML4 entry that is performed in Step S2420 in the above-mentioned FIG. 14 will be explained using FIG. 15.

In a loop from Step S2500 to S2548, the PML4 entry 1101 that is a creation target is created one by one. When the PML4 entry 1101 that is a creation target is only one, this loop is simply executed only once.

In Step S2504, regarding the PML4 entry 1101 of the first PT 160 corresponding to the PML4 entry of the shadow PT 140 to be created, it is judged whether the RSV-bit (s) is (are) 0. When the RSV-bit (s) is (are) 0, the flow proceeds to Step S2512; when the RSV-bit(s) is (are) nonzero, the flow proceeds to Step S2508.

In Step S2508, for a guest number of the guest in operation and an entry corresponding to the first PT that are included in the characteristic data 101 of the first PT, the reserved-bit use history is changed to 1.

In Step S2512, regarding the PML4 entry 1101 of the first PT 160 corresponding to the PML4 entry of the shadow PT 140 to be created, it is judged whether the P-bit is 0. When the P-bit is 0, the flow proceeds to Step S2528; when the P-bit is nonzero, the flow proceeds to Step S2516.

In Step S2516, it is judged whether the memory area corresponding to the PML4 entry 1101 of the shadow PT 140 to be created requires emulation for reading/writing. In this processing, the memory area that requires emulation for reading/writing is the memory area where the A-bit is set to 0 in the first PT. When the memory area requires emulation for reading/writing, the flow proceeds to Step S2520; when it does not require emulation for reading/writing, the flow proceeds to Step S2524.

In Step S2520, P-bit=1 is set and RSV-bit=nonzero is set in the PML4 entry 1101 of the shadow PT 140 to be created.

In Step S2524, P-bit=1 is set and RSV-bit=0 is set in the PML4 entry 1101 of the shadow PT 140 to be created.

In Step S2528, P-bit=0 is set and RSV-bit=0 is set in the PML4 entry 1101 of the shadow PT 140 to be created.

In Step S2532, regarding the PML4 entry 1101 of the first PT 160 corresponding to the PML4 entry 1101 of the shadow PT 140 to be created, it is judged whether the R/W-bit is 0. When the R/W-bit is 0, the flow proceeds to Step S2544; when the R/W-bit is nonzero, the flow proceeds to Step S2536.

In Step S2536, it is judged whether the memory area corresponding to the PML4 entry 1101 of the shadow PT 140 to be created requires emulation for writing. In this processing, the memory area that requires emulation for writing is the memory area where the D-bit is set to 0 in the first PT. When the memory area requires emulation for writing, the flow proceeds to Step S2544; when it does not require emulation for reading/writing, the flow proceeds to Step S2540.

In Step S2540, R/W-bit=1 is set in the PML4 entry 1101 of the shadow PT 140 to be created.

In Step S2544, R/W-bit=0 is set in the PML4 entry 1101 of the shadow PT 140 to be created.

Figure 16:
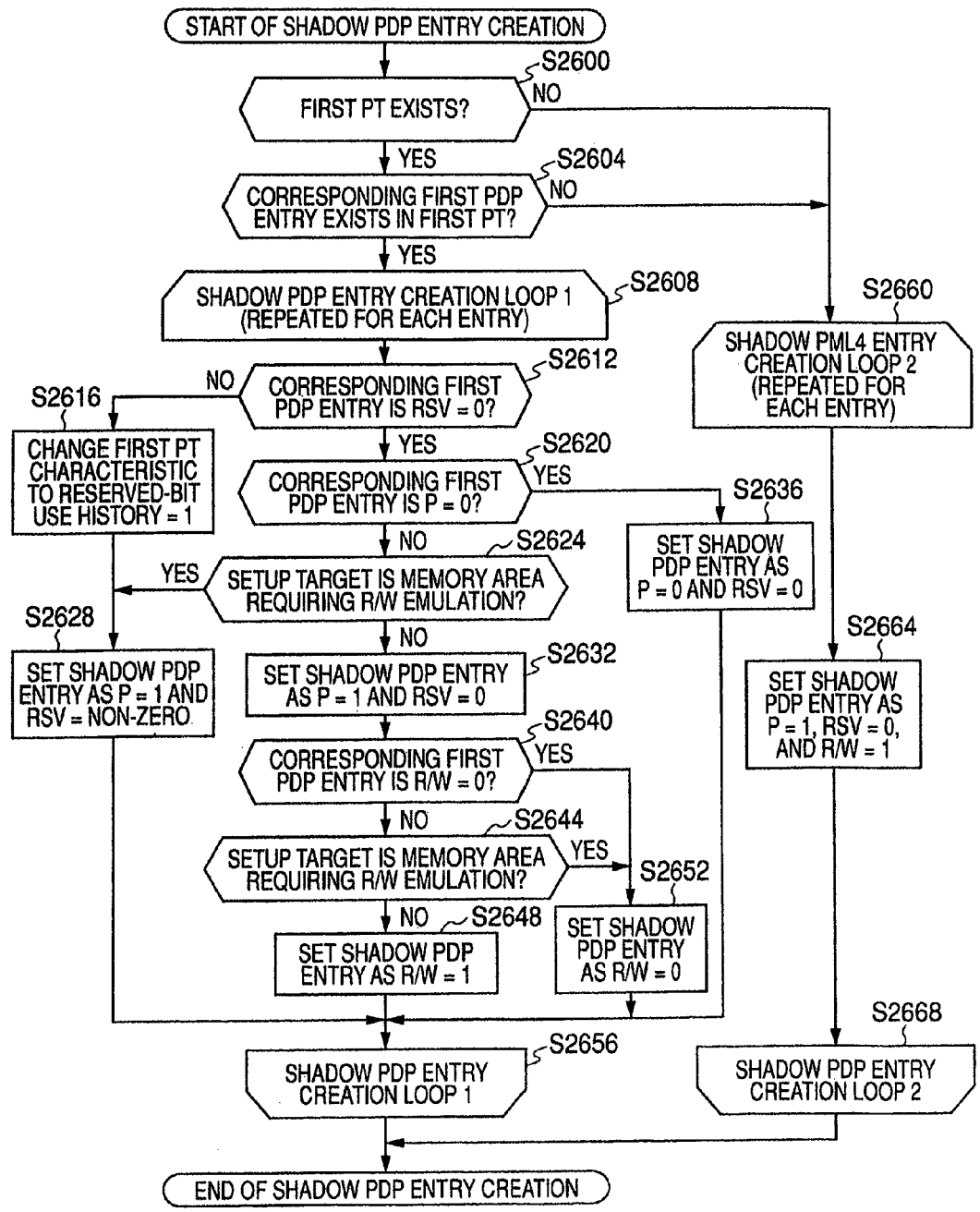
FIG. 16 is a flowchart showing one example of creation processing of a shadow PDP entry in the first embodiment of the present invention.

Creation of the PDP entry that is performed in Step S2440 in the above-mentioned FIG. 14 will be explained using FIG. 16.

In Step S2600, it is checked whether the first PT exists in the guest in operation. When the second OS 40 directly operates on the VMM 20, the first PT does not exist. Existence of the first PT is determined from the format of the first PT by referring to the characteristic data 101 of the first PT. When the first PT exists, the flow proceeds to Step S2604; when the first PT does not exist, the flow proceeds to Step S2660.

In Step S2604, it is checked whether the PDP table 1002 exists in the first PT for the memory area that is a creation target of the PDP entry 1102. In the x86 compatible CPU, the PDP table 1002 does not exist in the format of the PT, depending on the type of the format of PT. Therefore, existence of the PDP table 1002 in the first PT is determined from the format of the first PT by referring to the characteristic data 101 of the first PT. When the corresponding PDP table 1002 exists in the first PT, the flow proceeds to Step S2608; when the corresponding PDP table 1002 does not exist, the flow proceeds to Step S2660.

In a loop from Step S2608 to S2656, the PDP entry 1102 that is a creation target is created one by one. When the PDP entry 1102 that is a creation target is only one, this loop is simply executed only once.

In Step S2612, regarding the PDP entry 1102 of the first PT 160 corresponding to the PDP entry 1102 of the shadow PT 140 to be created, it is judged whether the RSV-bit(s) is (are) 0. When the RSV-bit(s) is (are) 0, the flow proceeds to Step S2620; when the RSV-bit (s) is (are) nonzero, the flow proceeds to Step S2616.

In Step S2616, for a guest number of the guest in operation and an entry corresponding to the first PT that are included in the characteristic data 101 of the first PT, the reserved-bit use history is changed to 1.

In Step S2620, regarding the PDP entry 1102 of the first PT 160 corresponding to the PDP entry 1102 of the shadow PT 140 to be created, it is judged whether the P-bit is 0. When the P-bit is 0, the flow proceeds to Step S2636; when the P-bit is nonzero, the flow proceeds to Step S2624.

In Step S2624, it is judged whether the memory area corresponding to the PDP entry 1102 of the shadow. PT 140 to be created requires emulation for reading/writing. In this processing, the memory area that requires emulation for reading/writing is the memory area where the A-bit is set to 0 in the first PT. When the memory area requires emulation for reading/writing, the flow proceeds to Step S2628; when it does not require emulation for reading/writing, the flow proceeds to Step S2632.

In Step S2628, P-bit=1 is set and RSV-bit=nonzero is set in the PDP entry 1102 of the shadow PT 140 to be created.

In Step S2632, P-bit=1 is set and RSV-bit=0 is set in the PDP entry 1102 of the shadow PT 140 to be created.

In Step S2636, P-bit=0 is set and RSV-bit=0 is set in the PDP entry 1102 of the shadow PT 140 to be created.

In Step S2640, regarding the PDP entry 1102 of the first PT 160 corresponding to the PDP entry 1102 of the shadow PT 140 to be created, it is judged whether the R/W-bit is 0. When the R/W-bit is 0, the flow proceeds to Step S2652; when the R/W-bit is nonzero, the flow proceeds to Step S2644.

In Step S2644, it is judged whether the memory area corresponding to the PDP entry 1102 of the shadow PT 140 to be created requires emulation for writing. In this processing, the memory area that requires emulation for writing is the memory area where the D-bit is set to 0 in the first PT. When the memory area requires emulation for writing, the flow proceeds to Step S2652; when it does not require emulation for reading/writing, the flow proceeds to Step S2648.

In Step S2648, R/W-bit=1 is set in the PDP entry 1102 of the shadow PT 140 to be created.

In Step S2652, R/W-bit=0 is set in the PDP entry 1102 of the shadow PT 140 to be created.

In a loop from Step S2660 to S2668, the PDP entry 1102 that is a creation target is created one by one. When the PDP entry 1102 that is a creation target is only one, this loop is simply executed only once.

In Step S2664, P-bit=1 is set, RSV-bit=0 is set, and R/W-bit=1 is set in the PDP entry 1102 of the shadow PT 140 to be created.

Figure 17:
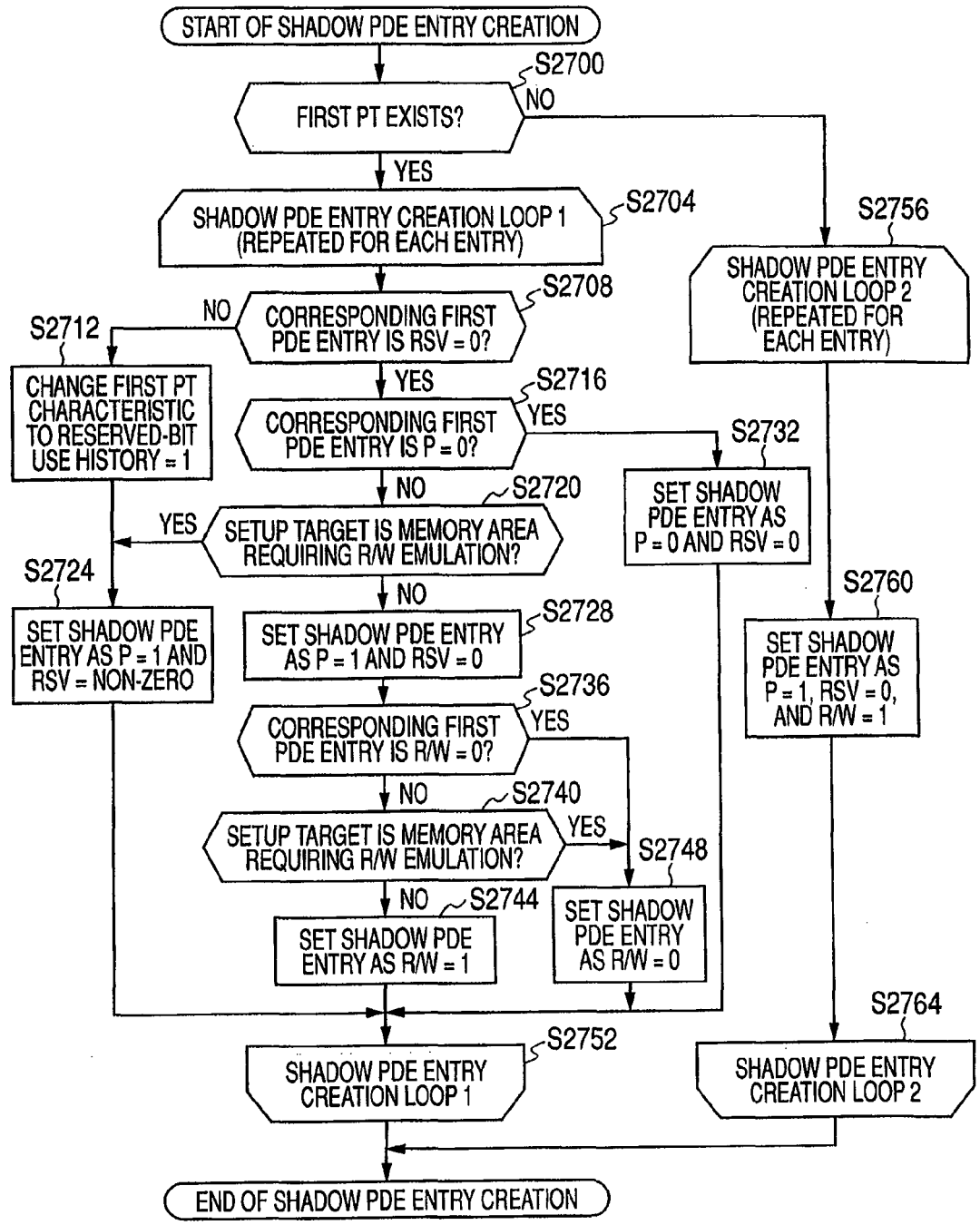
FIG. 17 is a flowchart showing one example of creation processing of a shadow PDE entry in the first embodiment of the present invention.

Creation of the PDE entry that is performed in Step S2460 in the above-mentioned FIG. 14 will be explained using FIG. 17.

In Step S2700, it is checked whether the first PT exists in the guest in operation. When the second OS 40 directly operates on the VMM 20, the first PT does not exist. Existence of the first PT is determined from the format of the first PT by referring to the characteristic data 101 of the first PT. When the first PT exists, the flow proceeds to Step S2704; when the first PT does not exist, the flow proceeds to Step S2756.

In a loop from Step S2704 to S2752, the PDE entry 1103 that is a creation target is created one by one. When the PDE entry 1103 that is a creation target is only one, this loop is simply executed only once.

In Step S2708, regarding the PDE entry 1103 of the first PT 160 corresponding to the PDE entry 1103 of the shadow PT 140 to be created, it is judged whether the RSV-bit(s) is (are) 0. When the RSV-bit (s) is (are) 0, the flow proceeds to Step S2716; when the RSV-bit (s) is (are) nonzero, the flow proceeds to Step S2712.

In Step S2712, for a guest number of the guest in operation and an entry corresponding to the first PT that are included in the characteristic data 101 of the first PT, the reserved-bit use history is changed to 1.

In Step S2716, regarding the PDE entry 1103 of the first PT 160 corresponding to the PDE entry 1103 of the shadow PT 140 to be created, it is judged whether the P-bit is 0. When the P-bit is 0, the flow proceeds to Step S2732; when the P-bit is nonzero, the flow proceeds to Step S2720.

In Step S2720, it is judged whether the memory area corresponding to the PDE entry 1103 of the shadow PT 140 to be created requires emulation for reading/writing. In this processing, the memory area that requires emulation for reading/writing is the memory area where the A-bit is set to 0 in the first PT. When the memory area requires emulation for reading/writing, the flow proceeds to Step S2724; when it does not require emulation for reading/writing, the flow proceeds to Step S2728.

In Step S2724, P-bit=1 is set and RSV-bit=nonzero is set in the PDE entry 1103 of the shadow PT 140 to be created.

In Step S2728, P-bit=1 is set and RSV-bit=0 is set in the PDE entry 1103 of the shadow PT 140 to be created.

In Step S2732, P-bit=0 is set and RSV-bit=0 is set in the PDE entry 1103 of the shadow PT 140 to be created.

In Step S2736, regarding the PDE entry 1103 of the first PT 160 corresponding to the PDE entry 1103 of the shadow PT 140 to be created, it is judged whether the R/W-bit is 0. When the R/W-bit is 0, the flow proceeds to Step S2748; when the R/W-bit is nonzero, the flow proceeds to Step S2740.

In Step S2740, it is judged whether the memory area corresponding to the PDE entry 1103 of the shadow PT 140 to be created requires emulation for writing. In this processing, the memory area that requires emulation for writing is the memory area where the D-bit is set to 0 in the first PT. When the memory area requires emulation for writing, the flow proceeds to Step S2748; when it does not require emulation for reading/writing, the flow proceeds to Step S2744.

In Step S2744, R/W-bit=1 is set in the PDE entry 1103 of the shadow PT 140 to be created.

In Step S2748, R/W-bit=0 is set in the PDE entry 1103 of the shadow PT 140 to be created.

In a loop from Step S2756 to S2764, the PDE entry 1103 that is a creation target is created one by one. When the PDE entry 1103 that is a creation target is only one, this loop is simply executed only once.

In Step S2760, P-bit=1 is set and R/W-bit=1 is set in the PDE entry 1103 of the shadow PT 140 to be created.

Figure 18:
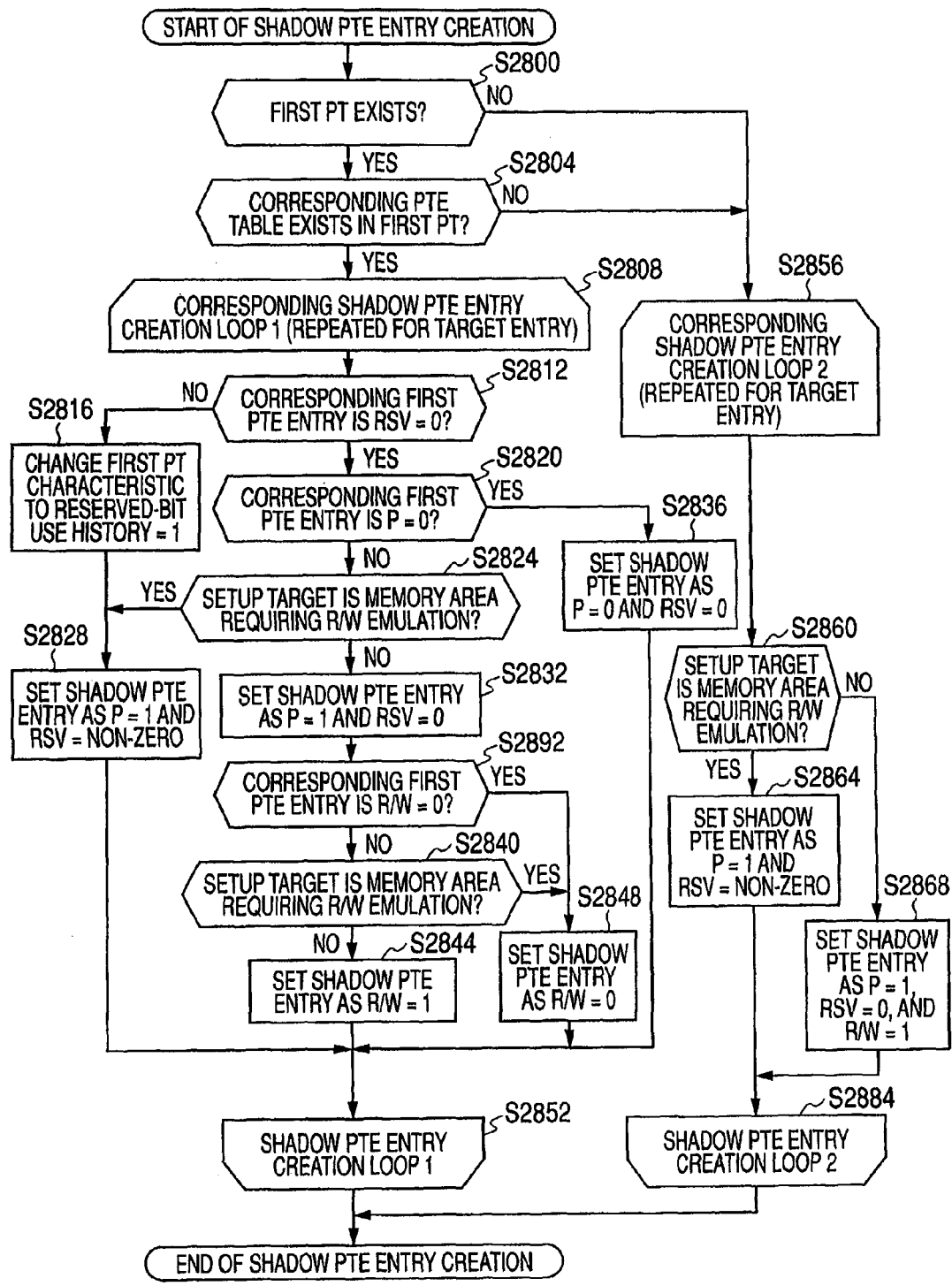
FIG. 18 is a flowchart showing one example of creation processing of a shadow PTE entry in the first embodiment of the present invention.

Creation of the shadow PTE entry that is performed in Step S2480 in the above-mentioned FIG. 14 will be explained using FIG. 18.

In Step S2800, it is checked whether the first PT exists in the guest in operation. When the second OS 40 directly operates on the VMM 20, the first PT does not exist. Existence of the first PT is determined from the format of the first PT by referring to the characteristic data 101 of the first PT. When the first PT exists, the flow proceeds to Step S2804; when the first PT does not exist, the flow proceeds to Step S2856.

In Step S2804, it is checked whether the PTE table 1004 exists in the first PT for the memory area that is a creation target of the PTE entry 1104. Only when the PDE entry 1103 corresponding to the memory area indicates PS=1 in the first PT, the corresponding PTE table 1004 does not exist. When the corresponding PTE table 1004 exists in the first PT, the flow proceeds to Step S2808; when the corresponding PTE table 1004 does not exist, the flow proceeds to Step S2856.

In a loop from Step S2808 to S2852, the PTE entry 1104 that is a creation target is created one by one. When the PTE entry 1104 that is a creation target is only one, this loop is simply executed only once.

In Step S2812, regarding the PTE entry 1104 of the first PT 160 corresponding to the PTE entry 1104 of the shadow PT 140 to be created, it is judged whether the RSV-bit is 0. When the RSV-bit is 0, the flow proceeds to Step S2820; when the RSV-bit is nonzero, the flow proceeds to Step S2816.

In Step S2816, for a guest number of the guest in operation and an entry corresponding to the first PT that are included in the characteristic data 101 of the first PT, the reserved-bit use history is changed to 1.

In Step S2820, regarding the PTE entry 1104 of the first PT 160 corresponding to the PTE entry 1104 of the shadow PT 140 to be created, it is judged whether the P-bit is 0. When the P-bit is 0, the flow proceeds to Step S2836; when the P-bit is nonzero, the flow proceeds to Step S2824.

In Step S2824, it is judged whether the memory area corresponding to the PTE entry 1104 of the shadow PT 140 to be created requires emulation for reading/writing. In this processing, the memory area that requires emulation for reading/writing is the memory area that satisfies either of the two conditions below. (Condition 1) An MMIO memory area used for a control of the I/O device. (Condition 2) A memory area where the A-bit is set to 0 in the first PT. When the memory area requires emulation for reading/writing, the flow proceeds to Step S2828; when it does not require emulation for reading/writing, the flow proceeds to Step S2832.

In Step S2828, P-bit=1 is set and RSV-bit=nonzero is set in the PTE entry 1104 of the shadow PT 140 to be created.

In Step S2832, P-bit=1 is set and RSV-bit=0 is set in the PTE entry 1104 of the shadow PT 140 to be created.

In Step S2836, P-bit=0 is set and RSV-bit=0 is set in the PTE entry 1104 of the shadow PT 140 to be created.

In Step S2892, regarding the PTE entry 1104 of the first PT 160 corresponding to the PTE entry 1104 of the shadow PT 140 to be created, it is judged whether the R/W-bit is 0. When the R/W-bit is 0, the flow proceeds to Step S2848; when the R/W-bit is nonzero, the flow proceeds to Step S2840.

In Step S2840, it is judged whether the memory area corresponding to the PTE entry 1104 of the shadow PT 140 to be created requires emulation for writing. In this processing, the memory area that requires emulation for writing is the memory area that satisfies either of the two conditions below. (Condition 1) A memory area where the first PT exists. (Condition 2) A memory area where the D-bit is set to 0 in the first PT. When the memory area requires emulation for writing, the flow proceeds to Step S2848; when it does not require emulation for reading/writing, the flow proceeds to Step S2844.

In Step S2844, R/W-bit=1 is set in the PTE entry 1104 of the shadow PT 140 to be created.

In Step S2848, R/W-bit=0 is set in the PTE entry 1104 of the shadow PT 140 to be created.

In a loop from Step S2856 to S2884, the PTE entry 1104 that is a creation target is created one by one. When the PTE entry 1104 that is a creation target is only one, this loop is simply executed once.

In Step S2860, it is judged whether the memory area corresponding to the PTE entry of the shadow PT 140 to be created requires emulation for reading/writing. In this processing, the memory area that requires emulation for reading/writing is the MMIO memory area used for a control of the I/O device. When the memory area requires emulation for reading/writing, the flow proceeds to Step S2864; when the memory area does not require emulation, the flow proceeds to Step S2868.

In Step S2864, P-bit=1 is set and RSV-bit=nonzero is set in the PTE entry 1104 of the shadow PT 140 to be created.

In Step S2868, P-bit=1 is set, RSV-bit=0 is set, and R/W-bit=1 is set in the PTE entry 1104 of the shadow PT 140 to be created.

<4. Summary>

According to the embodiments shown in the foregoing, by prohibiting reading/writing operations to the privileged memory using the RSV-bit(s) of the shadow PT 140, when an operation that violates the setting of the P-bit is performed in a state where the first OS 30 is operated on the VMM 20, it can be determined fast that the emulation is unnecessary; therefore, the overhead can be suppressed.

Second Embodiment

Hereafter, an embodiment where the present invention is applied to a VT-x compatible CPU equipped with a page exception detecting mechanism using only one PT, and only a plurality of second OS's are operated on the VMM will be described. Below, differences from the first embodiment will be explained based on accompanying drawings.

<1. Hardware Configuration>

Figure 19:
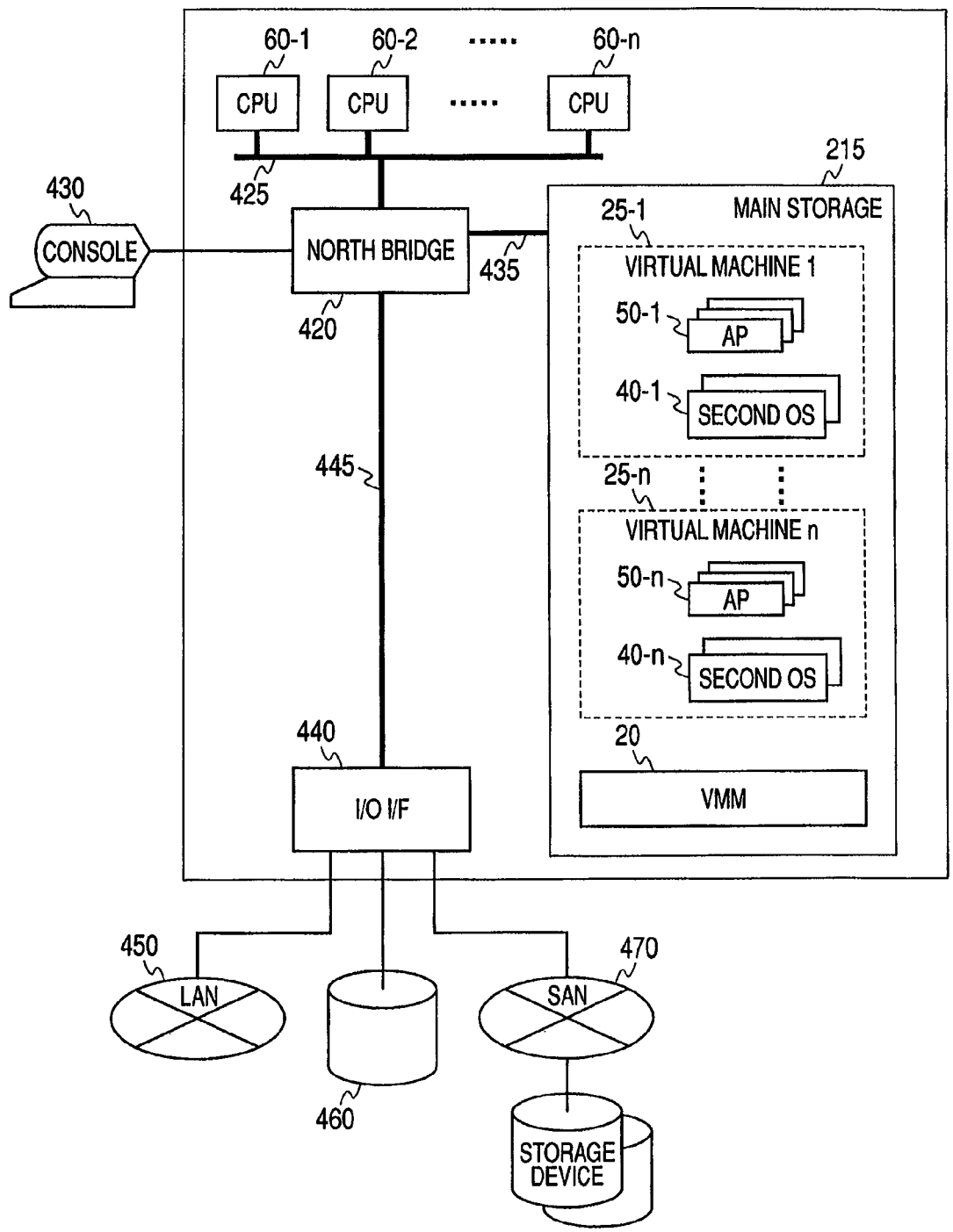
FIG. 19 is a schematic diagram showing an example of a hardware configuration of a virtual machine system in the second embodiment of the present invention.

A hardware configuration is, as shown in FIG. 19, different from the first embodiment only in the content of the main storage 215. A virtual machine monitor (VMM) 20 is loaded in the main storage 215, and the virtual machine 25 realized by this VMM 20 executes one or more second OS's 40. Moreover, the second OS executes an arbitrary AP 50 on the virtual machine 25.

<2. Software Configuration>

Figure 20:
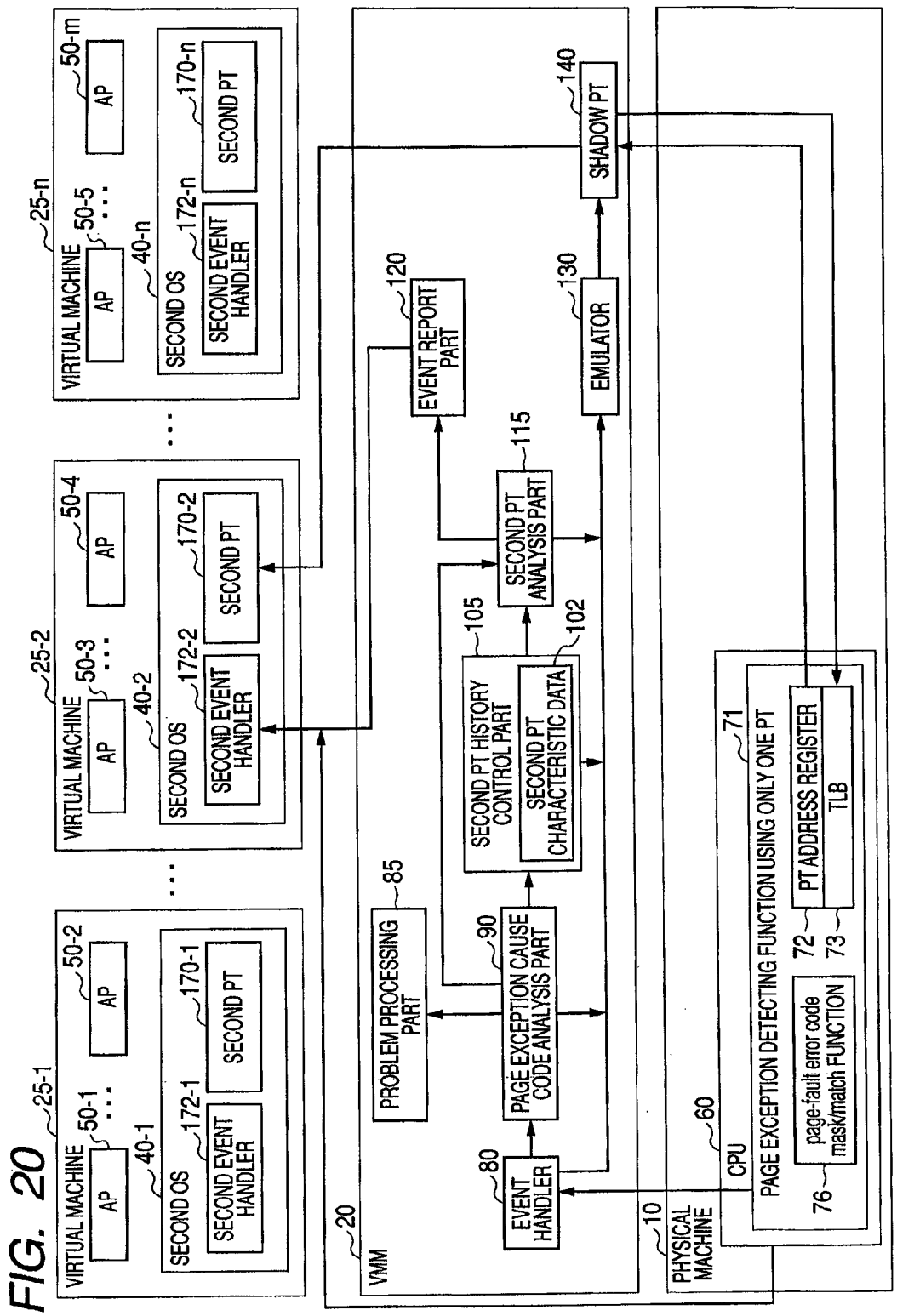
FIG. 20 is a block diagram showing a configuration example of principal parts of software and hardware of the virtual machine system in the second embodiment of the present invention.

In a software configuration, as shown in FIG. 20, parts of software relevant to the OS that operate on the VMM 20 and the CPU 60 differ from the first embodiment.

On the physical machine 10, the VMM 20 for controlling a plurality of virtual machines 25 is operating. The second OS 40 operates in the each virtual machine 25. Moreover, one or more applications (AP's 50) operate on the second OS 40.

The VMM 20 has: the shadow PT 140 that defines the access approval/disapproval in each memory area for each of the second OS's 40; the emulator 130 for emulating a hardware operation done by the guest; the event report part 120 for reporting an event, such as a page exception, to the second OS 40; the event handler 80 for processing an event occurred in the CPU 60; a problem processing part 85 for handling the problem that has occurred in the VMM 20; the page exception cause code analysis part 90 for analyzing the occurrence cause of an event by referring to the cause code passed to the event handler 80 at the time of occurrence of the page exception; a second PT history control part 105 for holding the access prohibition setting history of the memory area by the RSV-bit (s) in the second PT 170 that the second OS 40 holds, and a second PT analysis part 115 for analyzing whether a memory operation that generated the page exception violates the setting of the second PT.

In order to prohibit all the reading/writing for the MMIO (Memory Mapped I/O) memory address used for a control of the I/O device, the shadow PT 140 has an entry whose RSV-bit (s) is (are) set to nonzero. Moreover, in order to disable writing at a memory address at which the second PT 170 exists, the shadow PT 140 has an entry whose R/W-bit is set to 0. Furthermore, in order to disable reading/writing or writing for a part or the whole of the memory area where the guest did not operate, the shadow PT 140 has an entry whose RSV-bit(s) is (are) set to nonzero or R/W-bit is set to 0. For the memory areas corresponding to neither of them, a setting that inherits the access approval/disapproval specified in the second PT 170 is held.

The emulator 130 emulates a hardware operation by the guest. When the emulator 130 emulates an operation to the second PT, corresponding shadow PT 140 is updated inconformity with the setting of the guest. Moreover, when the emulator 130 detects occurrence of an event with respect to the guest, the event report part 120 is called. In order to report an event, such as a page exception, to the second OS, the event report part 120 creates states of the memory and the CPU immediately after the event occurrence, and causes a branch to the second event handler 172 that the second OS 40 has. The event handler 80 is called when the CPU 60 detects an event, such as a page exception, and causes a branch to a code in the VMM 20 in conformity with the kind of the event.

The page exception cause code analysis part 90 classifies crudely factors of page exceptions from the cause code being passed at the time of occurrence of a page exception, and determines a code to be executed next based on crudely classified factors. When the page exception results from a P-bit violation, the problem processing part 85 is called. When the page exception results from an RSV-bit violation, the second PT history control part 105 is called. When there is a possibility that the page exception may result from an R/W-bit violation, the second PT analysis part 115 is called. When the page exception corresponds to none of the above, the event report part 120 is called. The problem processing part 85 outputs information on the problem that has occurred in the VMM 20 using an external output device, such as the console 430.

The second PT history control part 105 holds the characteristic of the second PT 170 in the characteristic data 102 of the second PT. The second PT characteristic data 102 controls the format of the second PT 170 and existence of a history that all the reading/writing regarding the memory area are prohibited by setting the RSV-bit (s) to nonzero in the second PT. When there is no history that the RSV-bit (s) became nonzero in the second PT, the second PT history control part 105 calls the emulator 130; when there is a history that the RSV-bit (s) became nonzero in the second PT, it calls the second PT analysis part 115.

The second PT analysis part 115 analyzes whether the cause code that is passed to the event handler 80 at the time of occurrence of a page exception can occur with the setting of the second PT 170, and determines a code to be executed next. When with the setting in the second PT 170, the cause code that is passed to the event handler 80 at the time of occurrence of a page exception can occur, the event report part 120 is called; when it cannot occur, the emulator 130 is called.

The physical machine 10 has the x86 compatible CPU 60 and the CPU 60 has a page exception detecting function 71 using only one PT. The page exception detecting function 71 using only one PT has the TLB 73, the PT address register 72, and a page-fault error code mask/match function 76. The TLB 73 holds approval/disapproval of access to the memory area. The PT address register 72 holds a start address of the shadow PT 140. The setting of the access approval/disapproval in the shadow PT 140 is copied to the TLB 73. The page-fault error code mask/match function 76 holds the cause code of a page exception, and correspondence of an event handler called at the time of occurrence of a page exception.

The page exception detecting function 71 that uses only one PT, when detecting a memory operation prohibited by the shadow PT 140, saves the cause code and the operation target memory address, and causes a branch to the event handler 80 or the second event handler 172 in the VMM 20 in conformity with a setting of the page-fault error code mask/match function 76. The second OS 40 has the second PT 170 and the second event handler 172, and makes one or more AP's 50 operate.

Figure 30:
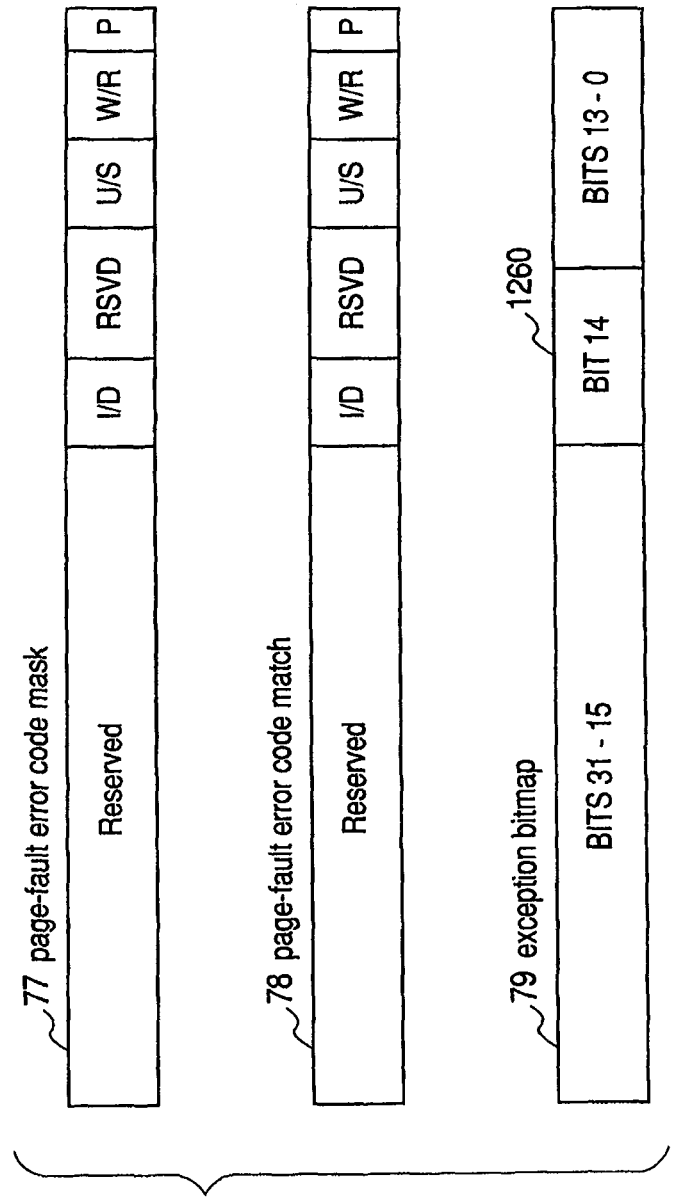
FIG. 30 shows a data structure used for a control of a page-fault error code mask/match function in the case of using a VT-x compatible CPU.

FIG. 30 shows formats of page-fault error code mask 77, page-fault error code match 78, and exception bitmap 79 that are set in the page-fault error code mask/match function 76. By a setting to the above mentioned, the cause code of a page exception and the event handler to be called are correlated. The page-fault error code mask 77 and the page-fault error code match 78 are of the same format as that of the cause code. The exception bitmap 79 is a value of 32 bits and each bit corresponds to an exception number of the x86 compatible CPU. The bit 14 (1260) corresponds to a page exception.

The page-fault error code mask/match function 76 calculates OR of the cause code of a page exception and the page-fault error code mask 77 at the time of occurrence of a page exception, and when the OR and the page-fault error code match 78 agree with each other, calls the second event handler 172/the event handler 80, respectively, according to 0/1 of the bit 14 (1260). When the OR and the page-fault error code match 78 do not agree with each other, the event handler 80/the second event handler 172 are called, respectively, according to 0/1 of the bit 14 (1260).

Figure 21:
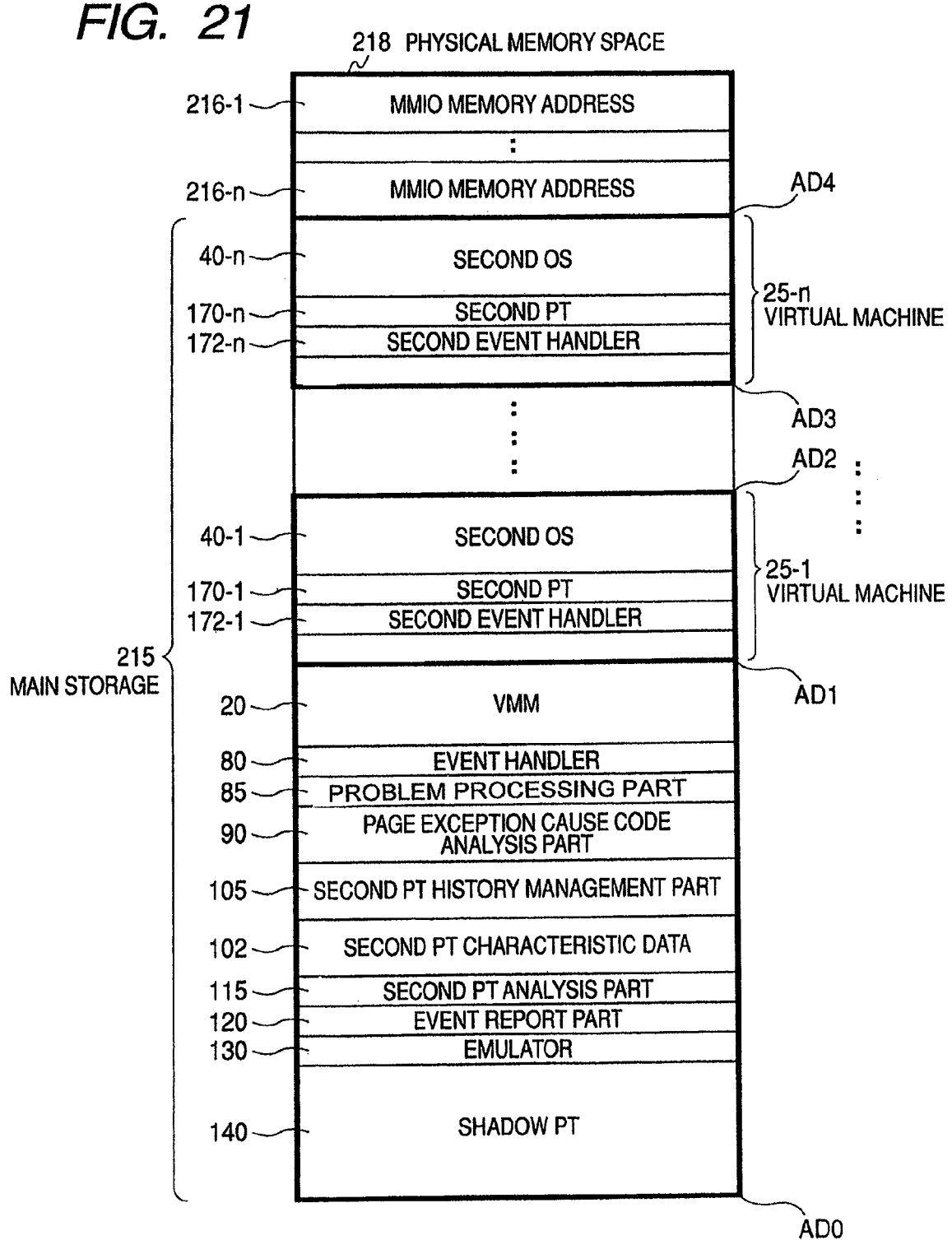
FIG. 21 is a diagram showing one example of a memory map of a main storage in the second embodiment of the present invention.

The physical memory space 218 differs, as shown in FIG. 21, from the content of memory allocated to the virtual machine 25 only in the second PT control part 105, the second PT analysis part 115, and the problem processing part 85 in the memory allocated to the VMM 20. The memory area of the each virtual machine 25 includes the second PT 170 and the second event handler 172 that the each second guest OS 40 created.

In the memory that the VMM 20 uses, the followings are allocated: the event handler 80, the problem processing part 85, the page exception cause code analysis part 90, the second PT history control part 105, the second PT characteristic data 102, the second PT analysis part 115, the event report part 120, the emulator 130, and the shadow PT 140.

Configurations of the shadow PT 140 and the second PT 170 are the same as those of the first embodiment. Setup values of the shadow PT 140 and the second PT 170 differ in the address fields (1111, 1112, 1113, 1114, 1115), the RSV-bit (s) 1119, and the R/W-bit 1117.

The VMM 20 sets the address fields (1111, 1112, 1113, 1114, and 1115) of the shadow PT 140 in conformity with a memory space allocated to the virtual machine 25. Moreover, for the second PT 170 correlated with the shadow PT 140, in order to detect entry updating of the second PT 170 done by the guest, the VMM 20 sets the R/W-bit of the shadow PT 140 used for entry updating of the second PT 170 to 0 to perform write protection. In order to prohibit reading/writing for the MMIO address that is used for a control of the I/O device, the VMM 20 sets the P-bit 1116 of the shadow PT 140 to 1, and sets the RSV-bit(s) 1119 to nonzero.

Moreover, for the memory area corresponding to an entry whose A-bit 1118 is 0 in the second PT 170, in order to emulate an updating operation of the A-bit 1118 of the second PT 170, the VMM 20 sets the P-bit of the shadow PT 140 to 1, and sets the RSV-bit(s) 1119 to nonzero. Moreover, for the memory area corresponding to an entry whose D-bit 1120 is 0 in the second PT 170, in order to emulate an updating operation of the D-bit 1120 of the second PT 170, the VMM 20 sets the R/W-bit of the shadow PT 140 to 0.

The format of the cause code created at the time of occurrence of a page exception is the same as that of the first embodiment. The format of the characteristic data 102 of the second PT differs, as shown in FIG. 22, from the first embodiment only in that a target is the second PT. The characteristic data 102 of the second PT is made up of an entry consisting of the guest number 1300, a second PT address 1350, a second PT format 1355, and the reserved-bit use history 1320.

The guest number 1300 is a number by which the virtual machine 25 is identified. The address 1350 of the second PT is a start memory address of the second PT 170. The format 1355 of the second PT is an identifier by which the PT format is differentiated. The reserved-bit use history 1320 is a variable that becomes 1 only when the RSV-bit(s) is (are) set to nonzero at least once in the second PT.

<3. Shadow PT Operation by VMM>

Next, one example of the shadow PT operation performed by the VMM in conformity with an operation of the guest will be explained below by referring to a flowchart.

<3.1. Outline of Shadow PT Operation by VMM>

A flow of overall processing when executing the guest on the VMM 20 is the same as that of FIG. 10 explained in the first embodiment. Below, a difference from the first embodiment will be explained in each step in FIG. 10.

In Step S2000, the VMM 20 accepts a guest's execution start demand and initializes the shadow PT 140 in conformity with an initial state of the virtual machine 25. Then, the VMM 20 passes a control to the guest OS, after writing an address of the shadow PT 140 in the PT address register 72 of the CPU 60.

Steps S2010, S2020, S2030, and S2040 are the same as those of the first embodiment.

In Step S2050, the VMM 20 detects whether the register relevant to the second PT is updated. In the x86 compatible CPU, there exist registers for specifying the format and an address of the PT, such as CR0, CR3, CR4, and IA32EFER. When the VMM 20 detects update of CR0, CR3, CR4, and IA32EFER by the guest, the VMM 20 updates corresponding characteristic data 102 of the second PT and lets the flow proceed to Step S2060. In other cases than the above, the flow proceeds to Step S2080.

In Step S2060, receiving change of the second PT format or the second PT address done by the guest, the VMM 20 reinitializes the shadow PT 140 in conformity with the second PT after the change.

In Step S2070, the VMM 20 analyzes a factor of a page exception, and as necessary reports the event to the second OS or performs emulation. Moreover, as necessary, the VMM 20 updates the shadow PT 140.

Step S2080 is the same as that of the first embodiment.

By the processing, during a time from start of execution of the guest until its end, the VMM 20 can keep a state in which the shadow PT 140 corresponding to the second PT 170 is registered in the CPU 60, generate a page exception to the privileged memory operation done by the guest, and emulate the memory privileged instruction.

<3.2. Initialization processing of shadow PT>

Figure 11:
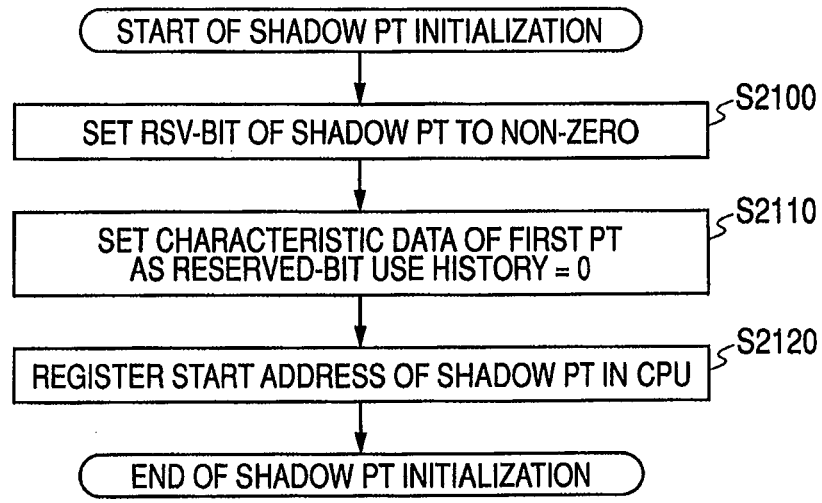
FIG. 11 is a flowchart showing one example of initialization processing of a shadow PT in the first embodiment of the present invention.
Figure 29:
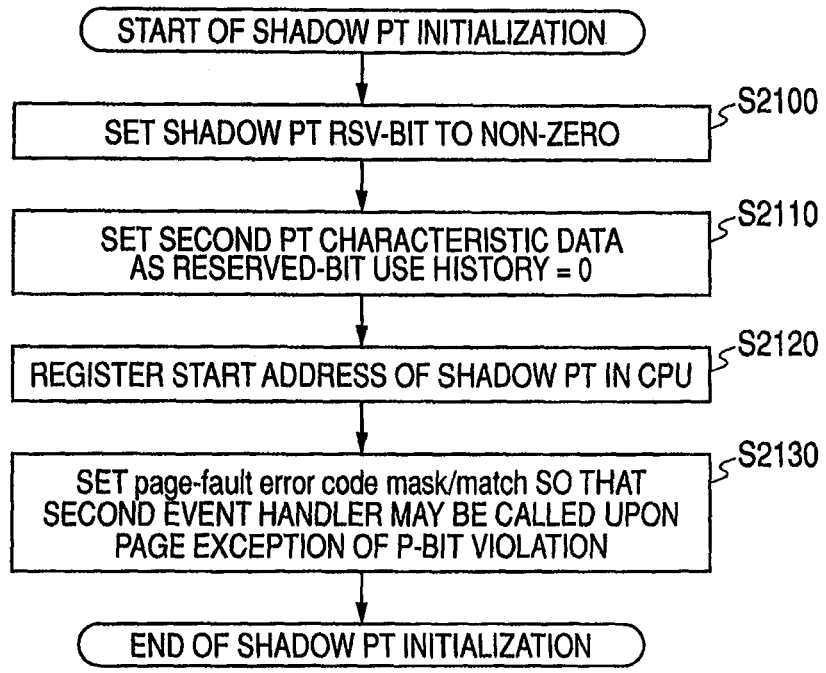
FIG. 29 is a flowchart showing one example of the initialization processing of the shadow PT in the second embodiment of the present invention.

A flow of the shadow PT initialization performed in the above-mentioned FIG. 11 differs only in the point of setting a page fault error code mask/match function and a register that is an operation target, as shown in FIG. 29.

Step S2100 is the same as that of the first embodiment.

In Step S2110, for an entry corresponding to a number of a guest during the initialization in the characteristic data 102 of the second PT, the VMM 20 sets the second PT address to 0, sets the format of the second PT to be without PT, and sets the reserved-bit use history to 0.

In Step S2120, the VMM 20 stores the start address of the initialized shadow PT 140 in the PT address register 72 that the CPU 60 has.

In Step S2130, the VMM 20 sets the page fault error code mask/match function 76 to be such that, when a page exception of the P-bit violation occurs, the second event handler is called. The contents of the setting may be such that the page-fault error code mask 77 is set to 1, the page-fault error code match 78 is set to 1, and the bit 14 (1260) is set to 1, or may be such that the page-fault error code mask 77 is set to 1, the page-fault error code match 78 is set to 0, and the bit 14 (1260) is set to 0.

<3.3. Reinitialization Processing of Shadow PT>

Figure 12:
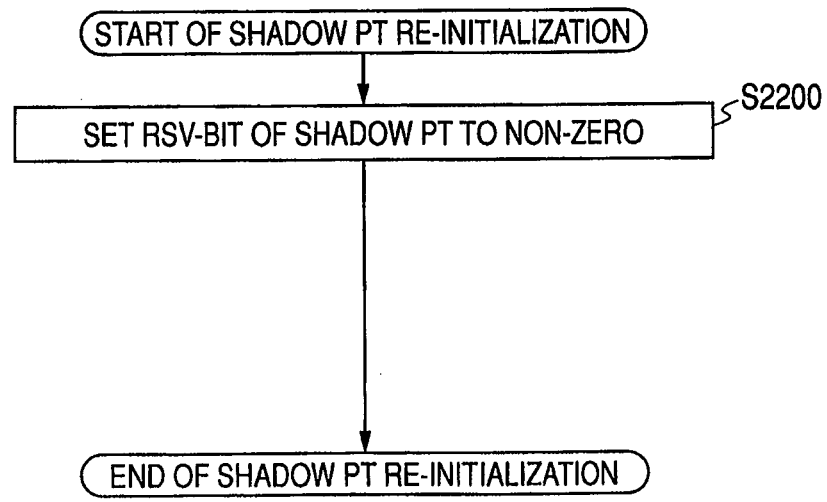
FIG. 12 is a flowchart showing one example of reinitialization processing of the shadow PT in the first and second embodiment of the present invention.

The reinitialization of the shadow PT performed in Step S2010 in the above-mentioned FIG. 10 is the same as that of the first embodiment, as shown in FIG. 12.

<3.4. Page Exception Handling>

Page exception handling performed in Step S2070 in the above-mentioned FIG. 10 will be explained using FIG. 23.

In Step S3300, the P field and the RSVD field of the cause code that were passed to the event handler 80 is referred to. When a memory operation that violates the P-bit is performed, namely when the P field is 0, the flow proceeds to Step S3360. When a memory operation that violates the RSV-bit(s) is performed, namely when the RSVD field is 1, the flow proceeds to Step S3310. In other cases than the above, the flow proceeds to Step S3355.

In Step S3355, the W/R field of the cause code is referred to; when it is 1, the flow proceeds to Step S3305, and when it is 0, the flow proceeds to Step S3325.

In Step S3310, by the characteristic data of the second PT being referred to, a guest number of the guest in operation and the reserved-bit use history corresponding to the second PT address are read. When the reserved-bit use history is 1, the flow proceeds to Step S3305; when the reserved-bit use history is 0, the flow proceeds to Step S3315.

In Step S3305, the setting of the second PT is analyzed and it is judged whether it is possible for the setting of the second PT to generate a page exception for an operation target memory address. When the setting of the second PT can generate a page exception, the flow proceeds to Step S3325; when it cannot generate a page exception, the flow proceeds to Step S3315.

In Step S3315, it is checked whether the operation target memory address is the privileged memory. When the target is the privileged memory, the flow proceeds to Step S3335; when the target is other than the privileged memory, the flow proceeds to Step S3350.

In Step S3335, the privileged memory operation is emulated and the flow proceeds to Step S3340.

In Step S3340, classification of the privileged memory that becomes an operation target is checked; when the operation target is the second PT, the flow proceeds to Step S3345, and when the operation target is not the second PT, the page exception handling is terminated.

In Step S3345, the entry of the corresponding shadow PT 140 is updated in conformity with updating of the second PT. As means of updating, all the reading/writing of memory may be prohibited by setting the P-bit to 1 and setting the RSV-bit(s) to nonzero. Alternatively, access approval may be set for the shadow PT entry in a range such that any operation to the memory area that requires emulation can be prohibited without being contrary to the access approval/disapproval specified by the second PT after updating.

In Step S3350, the shadow PT entry is updated in response to a memory operation by the guest.

In Step S3325, states of a CPU register and memory when the page exception is reported to the second OS are created.

In Step S3330, an address of a guest instruction to be executed next is changed to a start address of the second event handler.

In Step S3360, information about a problem that has occurred in the VMM 20 is outputted using an external outputting device, such as the console 430.

<3.5. Creation Processing of Shadow PT Entry>

Figure 23:
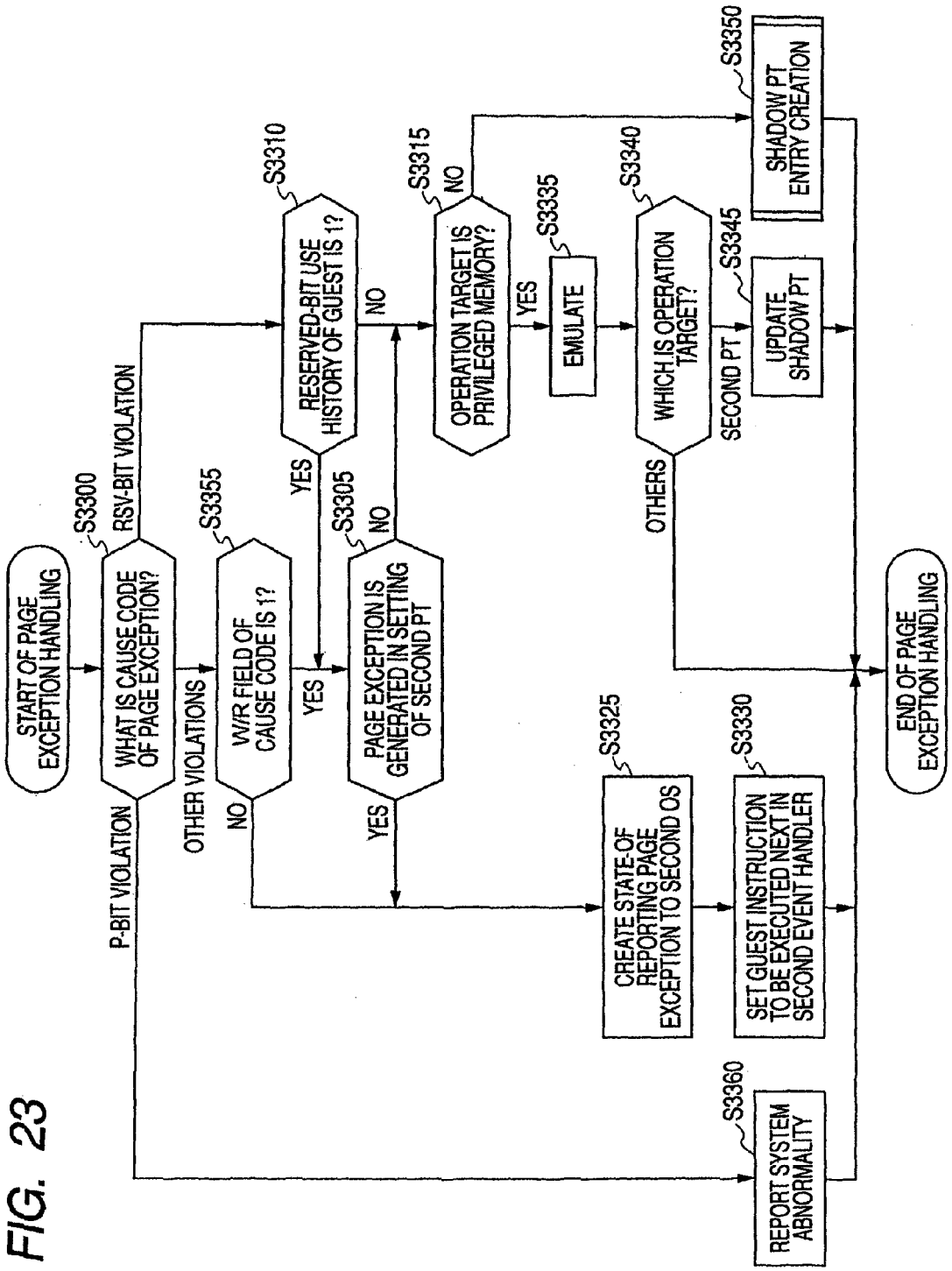
FIG. 23 is a flowchart showing one example of processing of the VMM with respect to a page exception in the second embodiment of the present invention.

Creation of the shadow PT entry that is performed in Step S3350 in the above-mentioned FIG. 23 differs from the first embodiment only in that the second PT format and data are referred to.

Figure 24:
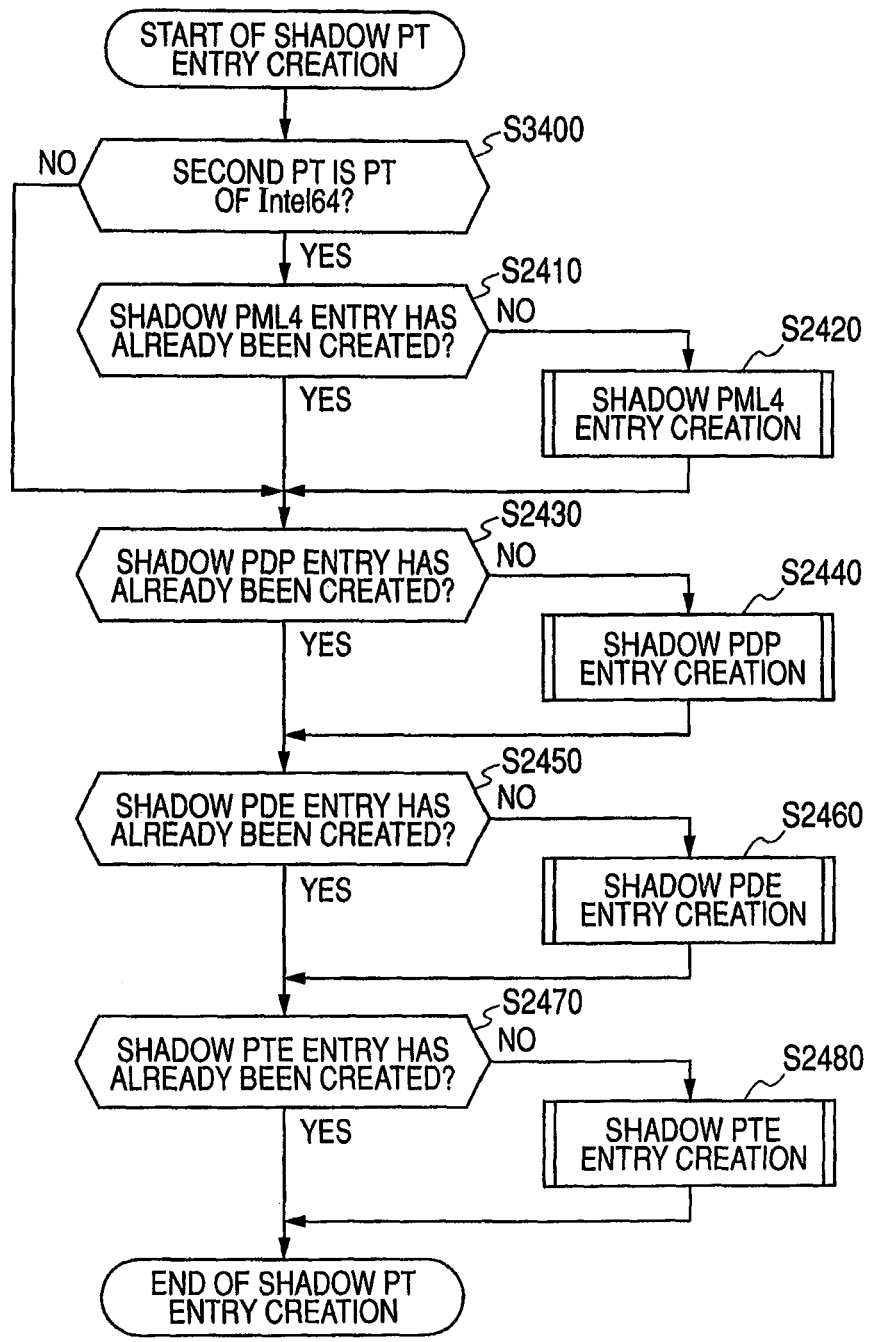
FIG. 24 is a flowchart showing one example of creation processing of the shadow PT entry in the second embodiment of the present invention.

As shown in FIG. 24, in Step S3400, it is checked whether the format of the second PT is the format for Intel64; if it is the format for Intel64, the flow proceeds to Step S2410, and if it is the format for non-Intel64, the flow proceeds to Step S2430

Step S2410 is the same as that of the first embodiment.

In Step S2420, the PML4 entry 1101 of the shadow PT 140 corresponding to the memory area where the page exception occurred is changed to an already-created state based on the setting of the second PT 170. In this processing, the PML4 entry 1101 corresponding to a different memory area from the memory area where the page exception occurred may be created, as an addition.

Step S2430 is the same as that of the first embodiment.

In Step S2440, the PDP entry 1102 of the shadow PT 140 corresponding to the memory area where the page exception occurred is changed to an already-created state based on the setting of the second PT 170. In this processing, the PDP entry 1102 corresponding to a different memory area from the memory area where the page exception occurred may be created, as an addition.

Step S2450 is the same as that of the first embodiment.

In Step S2460, the PDE entry of the shadow PT 140 corresponding to the memory area where the page exception occurred is changed to an already-created state based on the setting of the second PT 170. In this processing, the PDE entry 1103 corresponding to a different memory area from the memory area where the page exception occurred may be created, as an addition.

Step S2470 is the same as that of the first embodiment.

In Step S2480, the PTE entry 1104 of the shadow PT 140 corresponding to the memory area where the page exception occurred is changed to an already-created state based on the setting of the second PT 170. In this processing, the PTE entry 1104 corresponding to a different memory area from the memory area where the page exception occurred may be created, as an addition.

Figure 25:
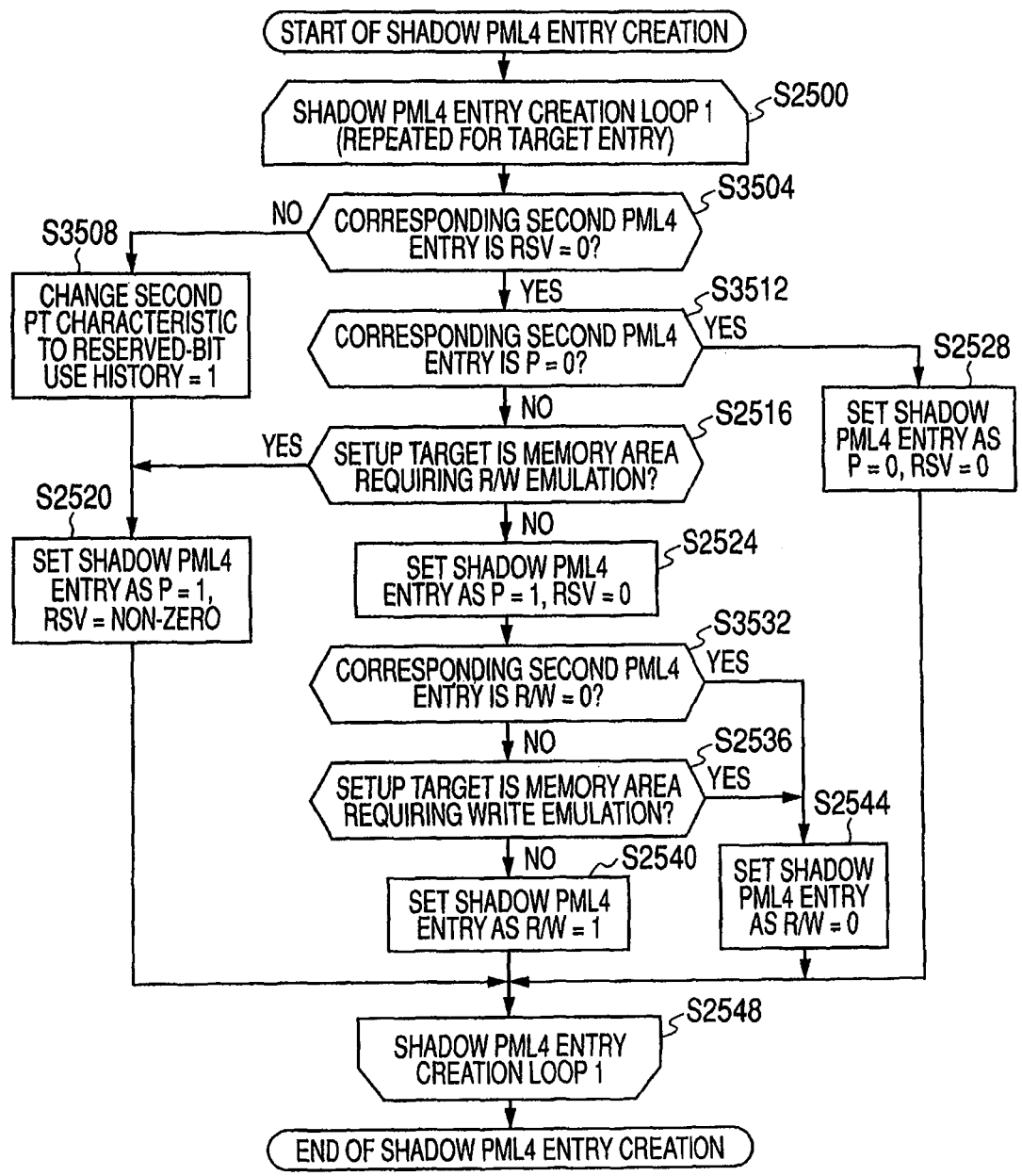
FIG. 25 is a flowchart showing one example of creation processing of a shadow PML4 entry in the second embodiment of the present invention.

Creation of the PML4 entry that is performed in Step S2420 in the above-mentioned FIG. 24 differs from the first embodiment only in that the second PT 170 is referred to, as shown in FIG. 25.

In a loop from Step S2500 to S2548, the PML4 entry 1101 that is a creation target is created one by one. When the PML4 entry 1101 that is a creation target is only one, this loop is simply executed only once.

In Step S3504, regarding the PML4 entry 1101 of the second PT 170 corresponding to the PML4 entry 1101 of the shadow PT 140 to be created, it is judged whether the RSV-bit (s) is (are) 0. When the RSV-bit(s) is (are) 0, the flow proceeds to Step S3512; when the RSV-bit(s) is (are) nonzero, the flow proceeds to Step S3508.

In Step S3508, the reserved-bit use history is changed to 1 for a guest number of the guest in operation and an entry corresponding to the second PT that are included in the characteristic data 102 of the second PT.

In Step S3512, regarding the PML4 entry 1101 of the second PT 170 corresponding to the PML4 entry 1101 of the shadow PT 140 to be created, it is judged whether the P-bit is zero. When the P-bit is 0, the flow proceeds to Step S2528; when the P-bit is nonzero, the flow proceeds to Step S2516.

In Step S2516, it is judged whether the memory area corresponding to the PML4 entry 1101 of the shadow PT 140 to be created requires emulation for reading/writing. In this processing, the memory area that requires emulation for reading/writing is the memory area where the A-bit is set to 0 in the second PT. When the memory area requires emulation for the reading/writing, the flow proceeds to Step S2520; when the memory area does not require emulation for reading/writing, the flow proceeds to Step S2524.

Steps S2520, S2524, and S2528 are the same as those of the first embodiment.

In Step S3532, regarding the PML4 entry of the second PT 170 corresponding to the PML4 entry 1101 of the shadow PT 140 to be created, it is judged whether the R/W-bit is 0. When the R/W bit is 0, the flow proceeds to Step S2544; when the R/W bit is nonzero, the flow proceeds to Step S2536.

In Step S2536, it is judged whether the memory area corresponding to the PML4 entry 1101 of the shadow PT 140 to be created requires emulation for writing. In this processing, the memory area that requires emulation for writing is the memory area where the D-bit is set to 0 in the second PT. When the memory area requires emulation for writing, the flow proceeds to Step S2544; when the memory area does not require emulation for reading/writing, the flow proceeds to Step S2540.

Steps S2540 and S2544 are the same as those of the first embodiment.

Figure 26:
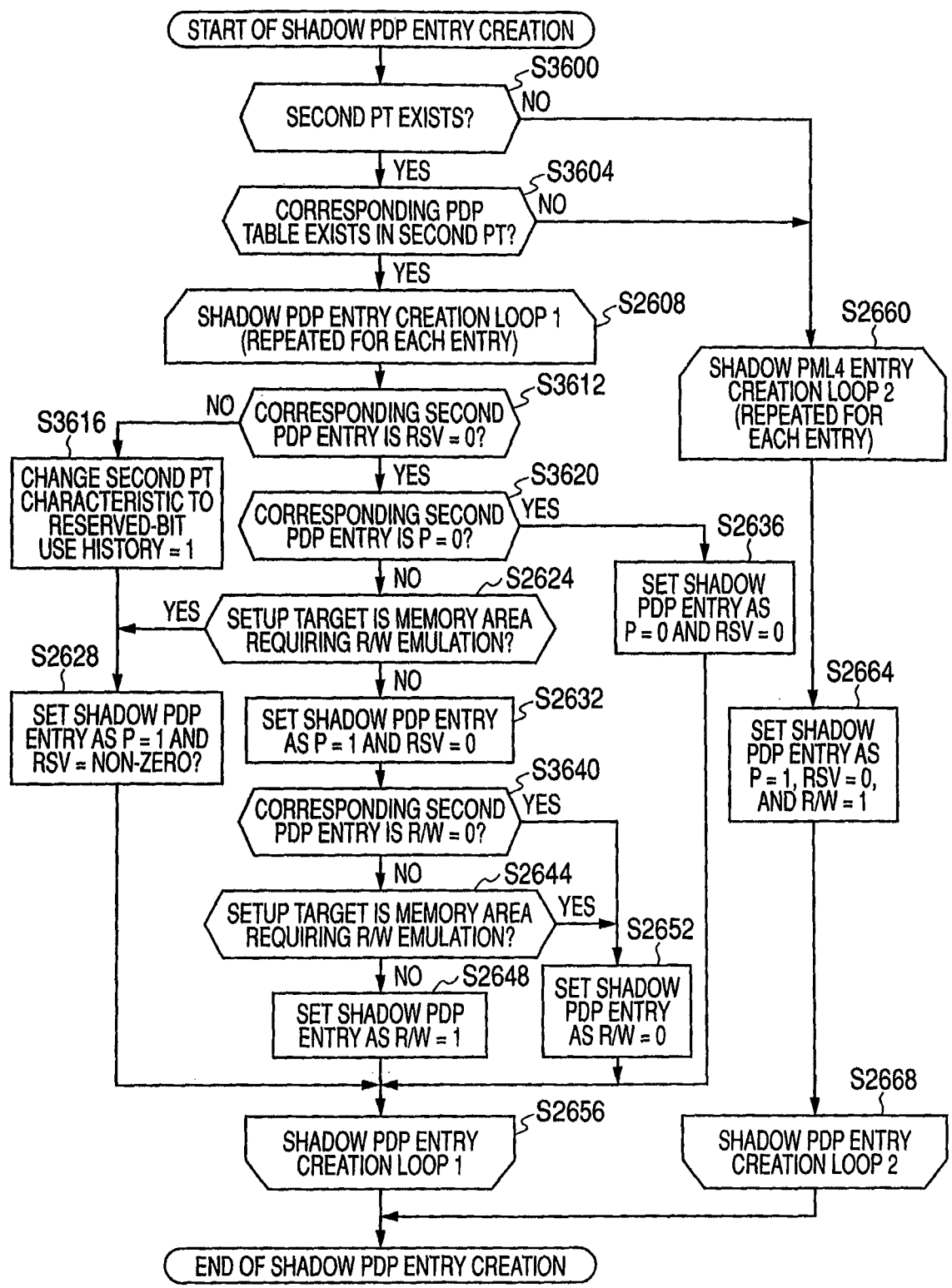
FIG. 26 is a flowchart showing one example of creation processing of a shadow PDP entry in the second embodiment of the present invention.

Creation of a PDP entry that is performed in Step S2440 in the above-mentioned FIG. 24 differs from the first embodiment only in that the second PT 170 is referred to, as shown in FIG. 26.

In Step S3600, it is checked whether the second PT exists in the guest in operation. Existence of the second PT is determined from the format of the second PT by referring to the characteristic data 102 of the second PT. When the second PT exists, the flow proceeds to Step S3604; when the second PT does not exist, the flow proceeds to Step S2660.

In Step S3604, it is checked whether the PDP table exists in the second PT for the memory area that is a creation target of the PDP entry 1102. With the x86 compatible CPU, the PDP table 1002 does not exist depending on the format of the PT. Therefore, existence of the PDP table 1002 in the second PT is determined from the format of the second PT by referring to the characteristic data 102 of the second PT. When the corresponding PDP table 1002 exists in the second PT, the flow proceeds to Step S2608; when the corresponding PDP table does not exist, the flow proceeds to Step S2660.

In a loop from Step S2608 to S2656, the PDP entry 1102 that is a creation target is created one by one. When the PDP entry 1102 that is a creation target is only one, this loop is simply executed only once.

In Step S3612, regarding the PDP entry 1102 of the second PT 170 corresponding to the PDP entry 1102 of the shadow PT 140 to be created, it is judged whether the RSV-bit(s) is (are) 0. When the RSV-bit (s) is (are) 0, the flow proceeds to Step S3620; when the RSV-bit (s) is (are) nonzero, the flow proceeds to Step S3616.

In Step S3616, for a guest number of the guest in operation and an entry corresponding to the second PT that are included in the characteristic data 102 of the second PT, the reserved-bit use history is changed to 1.

In Step S3620, regarding the PDP entry 1102 of the second PT 170 corresponding to the PDP entry 1102 of the shadow PT 140 to be created, it is judged whether the P-bit is 0. When the P-bit is 0, the flow proceeds to Step S2636; when the P-bit is nonzero, the flow proceeds to Step S2624.

In Step S2624, it is judged whether the memory area corresponding to the PDP entry 1102 of the shadow PT 140 to be created requires emulation for reading/writing. In this processing, the memory area that requires emulation for reading/writing is the memory area where the A-bit is set to 0 in the second PT. When the memory area requires emulation for reading/writing, the flow proceeds to Step S2628; when it does not require emulation for reading/writing, the flow proceeds to Step S2632.

Steps S2628, S2632, and S2636 are the same as those of the first embodiment.

In Step S3640, regarding the PDP entry 1102 of the second PT 170 corresponding to the PDP entry 1102 of the shadow PT 140 to be created, it is judged whether the R/W-bit is 0. When the R/W-bit is 0, the flow proceeds to Step S2652; when the R/W-bit is nonzero, the flow proceeds to Step S2644.

In Step S2644, it is judged whether the memory area corresponding to the PDP entry 1102 of the shadow PT 140 to be created requires emulation for writing. In this processing, the memory area that requires emulation for writing is the memory area where the D-bit is set to 0 in the second PT. When the memory area requires emulation for writing, the flow proceeds to Step S2652; when it does not require emulation for writing, the flow proceeds to Step S2648.

Steps S2648 and S2852 are the same as those of the first embodiment.

The loop from Step S2660 to S2668 is the same as that of the first embodiment. Step S2664 is the same as that of the first embodiment.

Figure 27:
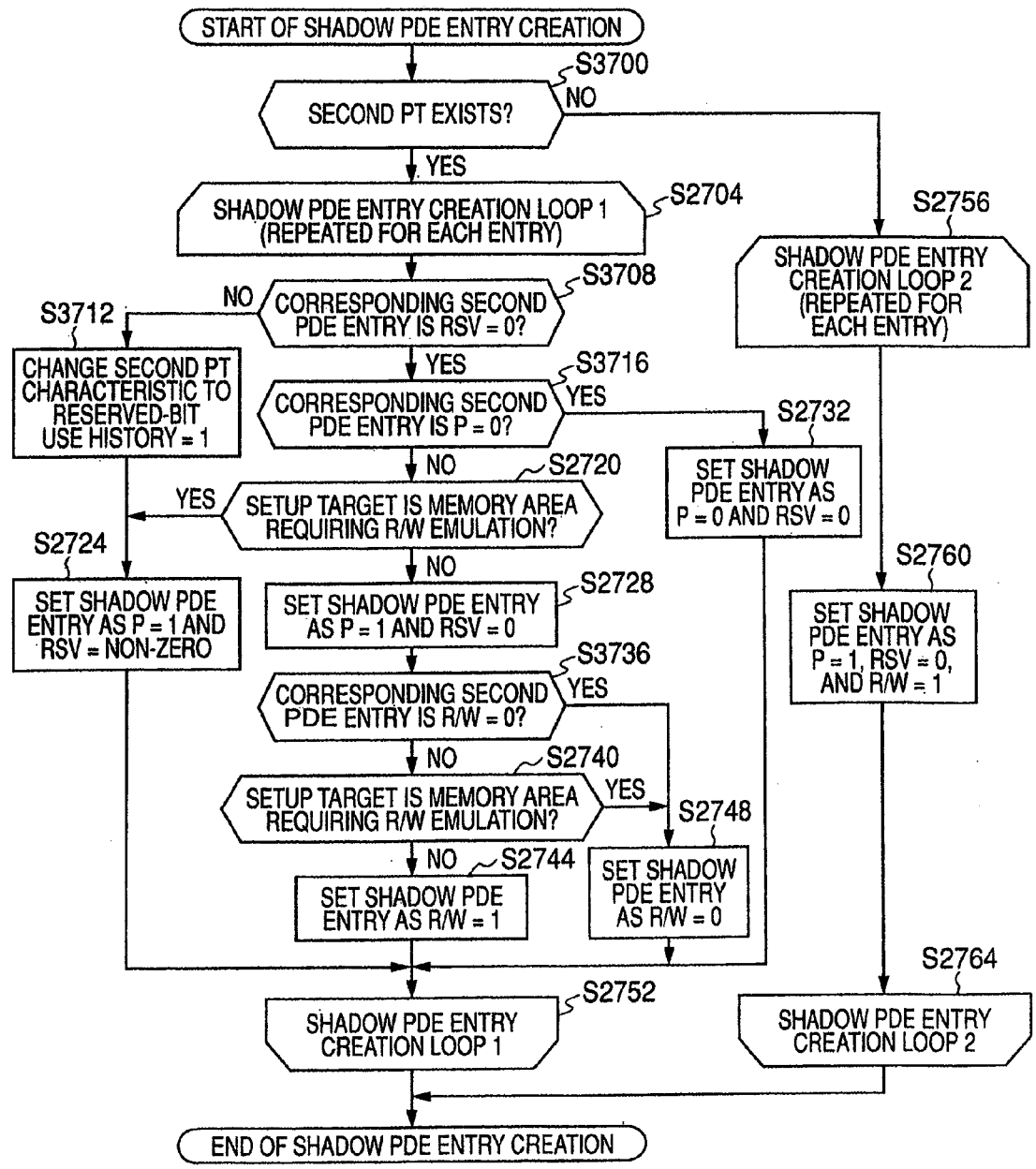
FIG. 27 is a flowchart showing one example of creation processing of a shadow PDE entry in the second embodiment of the present invention.

Creation of the PDE entry that is performed in Step S2460 in the above-Mentioned FIG. 24 differs from the first embodiment only in that the second PT 170 is referred to, as shown in FIG. 27.

In Step S3700, it is checked whether the second PT exists in the guest in operation. Existence of the second PT is determined from the format of the second PT by referring to the characteristic data 102 of the second PT. When the second PT exists, the flow proceeds to Step S2704; when the second PT does not exist, the flow proceeds to Step S2756.

In a loop from Step S2704 to S2752, the PDE entry 1103 that is a creation target is created one by one. When the PDE entry 1103 that is a creation target is only one, this loop is simply executed only once.

In Step S3708, regarding the PDE entry 1103 of the second PT 170 corresponding to the PDE entry 1103 of the shadow PT 140 to be created, it is judged whether the RSV-bit(s) is (are) 0. When the RSV-bit (s) is (are) 0, the flow proceeds to Step S3716; when the RSV-bit (s) is (are) nonzero, the flow proceeds to Step S3712.

In Step S3172, for a guest number of the guest in operation and an entry corresponding to the second PT that are included in the characteristic data 102 of the second PT, the reserved-bit use history is changed to 1.

In Step S3716, regarding the PDE entry 1103 of the second PT 170 corresponding to the PDE entry 1103 of the shadow PT 140 to be created, it is judged whether the P bit is 0. When the P-bit is 0, the flow proceeds to Step S2732; when the P-bit is nonzero, the flow proceeds to Step S2720.

In Step S2720, it is judged whether the memory area corresponding to the PDE entry 1103 of the shadow PT 140 to be created requires emulation for reading/writing. In this processing, the memory area that requires emulation for reading/writing is the memory area where the A-bit is set to 0 in the second PT. When the memory area requires emulation for reading/writing, the flow proceeds to Step S2724; when it does not require emulation for reading/writing, the flow proceeds to Step S2728.

Steps S2724, S2728, and S2732 are the same as those of the first embodiment.

In Step S3736, regarding the PDE entry 1103 of the second PT 170 corresponding to the PDE entry 1103 of the shadow PT 140 to be created, it is judged whether the R/W-bit is 0. When the R/W-bit is 0, the flow proceeds to Step S2748; when the R/W-bit is nonzero, the flow proceeds to Step S2740.

In Step S2740, it is judged whether the memory area corresponding to the PDE entry 1103 of the shadow PT 140 to be created requires emulation for writing. In this processing, the memory area that requires emulation for writing is the memory area where the D-bit is set to 0 in the second PT. When the memory area requires emulation for writing, the flow proceeds to Step S2748; when it does not require emulation for reading/writing, the flow proceeds to Step S2744.

Steps S2744 and S2748 are the same as those of the first embodiment.

The loop from Step S2756 to S2764 is the same as that of the first embodiment. Step S2760 is the same as that of the first embodiment.

Figure 28:
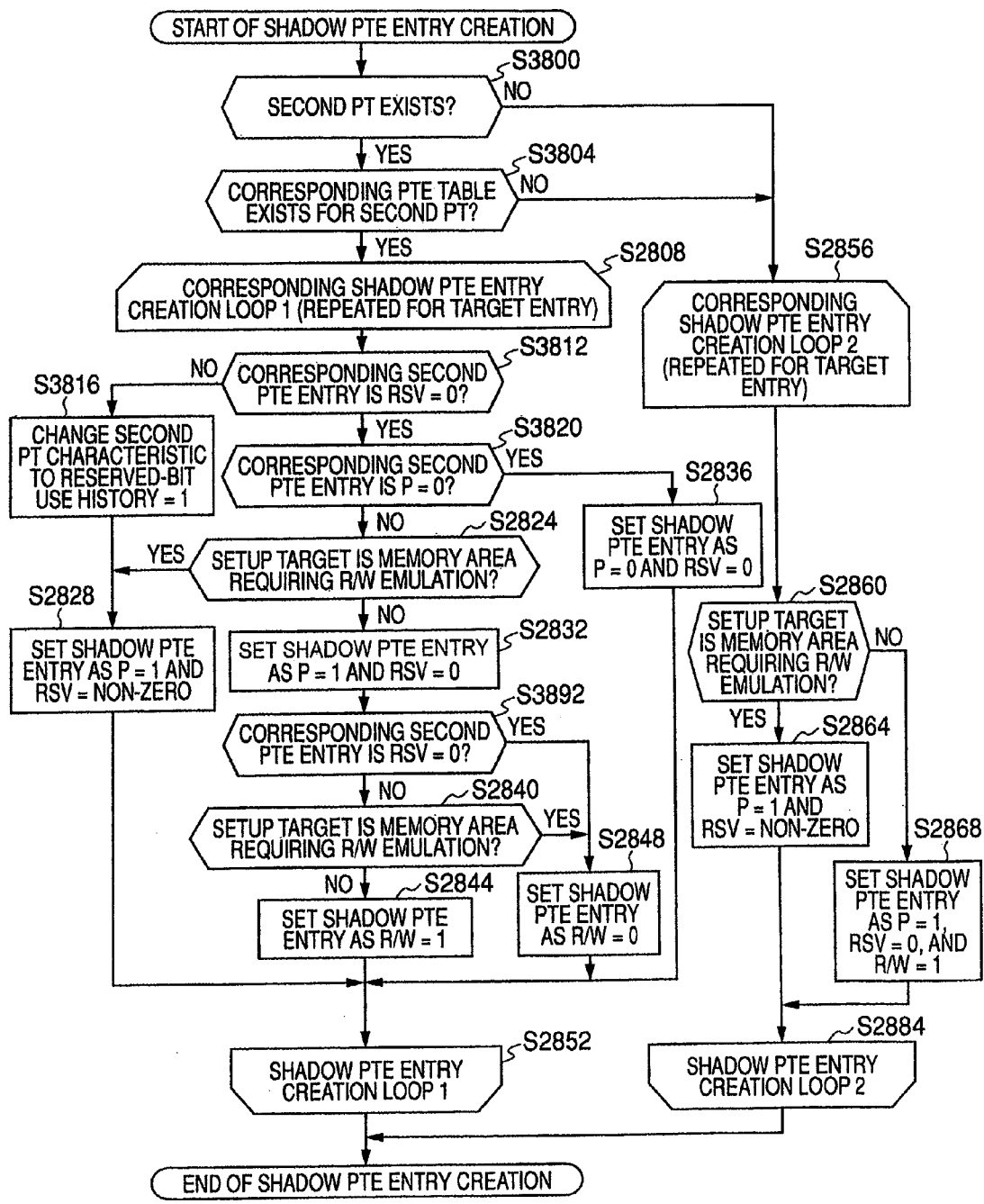
FIG. 28 is a flowchart showing one example of creation processing of the shadow PTE entry in the second embodiment of the present invention.

Creation of the PTE entry that is performed in the above-mentioned FIG. 24 differs from the first embodiment only in that the second PT 170 is referred to, as shown in FIG. 28.

In Step S3800, it is checked whether the second PT exists in the guest in operation. Existence of the second PT is determined from the format of the second PT by referring to the characteristic data 102 of the second PT. When the second PT exists, the flow proceeds to Step S3804; when the second PT does not exist, the flow proceeds to Step S2856.

In Step S3804, it is checked whether the PTE table 1004 exists in the second PT for the memory area that is a creation target of the PTE entry 1104. Only when the PDE entry 1103 corresponding to the memory area indicates PS=1 in the second PT, the corresponding PTE table 1004 does not exist. When the corresponding PTE table 1004 exists in the second PT, the flow proceeds to Step S2808; when the corresponding PTE table 1004 does not exist, the flow proceeds to Step S2856.

In a loop from Step S2808 to S2852, the PTE entry 1104 that is a creation target is created one by one. When the PTE entry 1104 becoming a creation target is only one, this loop is simply executed only once.

In Step S3812, regarding the PTE entry 1104 of the second PT 170 corresponding to the PTE entry 1104 of the shadow PT 140 to be created, it is judged whether the RSV-bit(s) is (are) 0. When the RSV-bit (s) is (are) 0, the flow proceeds to Step S3820; when the RSV-bit (s) is (are) nonzero, the flow proceeds to Step S3816.

In Step S3816, for a guest number of the guest in operation and an entry corresponding to the second PT that are included in the characteristic data 102 of the second PT, the reserved-bit use history is changed to 1.

In Step S3820, regarding the PTE entry 1104 of the second PT 170 corresponding to the PTE entry 1104 of the shadow PT 140 to be created, it is judged whether the P-bit is 0. When the P-bit is 0, the flow proceeds to Step S2836; when the P-bit is nonzero, the flow proceeds to Step S2824.

In Step S2824, it is judged whether the memory area corresponding to the PTE entry of the shadow PT 140 to be created requires emulation for reading/writing. In this processing, the memory area that requires emulation for reading/writing is the memory area that satisfies either of two conditions below. (Condition 1) An MMIO memory area used for a control of the I/O device. (Conditions 2) A memory area where the A-bit is set to 0 in the second PT. When the memory area requires emulation for reading/writing, the flow proceeds to Step S2828; when it does not require emulation for reading/writing, the flow proceeds to Step S2832.

Steps S2828, S2832, and S2836 are the same as those of the first embodiment.

In Step S3892, regarding the PTE entry 1104 of the second PT 170 corresponding to the PTE entry 1104 of the shadow PT 140 to be created, it is judged whether the R/W-bit is 0. When the R/W-bit is 0, the flow proceeds to Step S2848; when the R/W-bit is nonzero, the flow proceeds to Step S2840.

In Step S2840, it is judged whether the memory area corresponding to the PTE entry 1104 of the shadow PT 140 to be created requires emulation for writing. In this processing, the memory area that requires emulation for writing is the memory area that satisfies either of two conditions below. (Condition 1) A memory area where the second PT exists. (Condition 2) A memory area where the D-bit is set to 0 in the second PT. When the memory area requires emulation for writing, the flow proceeds to Step S2848; when it does not require emulation, the flow proceeds to Step S2844.

Steps S2844 and S2848 are the same as those of the first embodiment.

In a loop from Step S2856 to S2884, the PTE entry 1104 that is a creation target is created one by one. When the PTE entry 1104 that is a creation target is only one, this loop is simply executed only once.

In Step S2860, it is judged whether the memory area corresponding to the PTE entry 1104 of the shadow PT 140 to be created requires emulation for reading/writing. In this processing, the memory area that requires emulation for reading/writing is the MMIO memory area used for a control of the I/O device. When the memory area requires emulation for reading/writing, the flow proceeds to Step S2864; when it does not require emulation for reading/writing, the flow proceeds to Step S2868.

Steps S2864 and S2868 are the same as those of the first embodiment.

<4. Summary>

According to the embodiments shown in the foregoing, by prohibiting reading/writing operations to the privileged memory using the RSV-bit(s) of the shadow PT 140, when an operation that violates the setting of the P-bit is performed in a state where the second OS 40 is operated on the VMM 20, it can be determined fast that the emulation is unnecessary; therefore, the overhead can be suppressed.

Although the invention made by these inventors was concretely explained above based on the embodiments, it is natural that the present invention is not limited to the above-mentioned embodiments, and it can be modified variously without departing from the gist of the present invention.

The virtual machine system of the present invention is especially a useful technology when being applied to a virtual machine system equipped with a x86 compatible CPU, and, not being limited by this, can be widely applied to a virtual machine system in general

What is claimed is:

1. A control program of a virtual machine that makes a plurality of OS's operate using a computer having a CPU and memory,
    wherein the CPU has a memory protection function that is controlled based on a data structure,
    wherein the data structure has a first field used for determination of validity of a memory address and a second field which is a reserved field,
    wherein the first field and the second field control approval/disapproval of a memory operation in each memory area,
    wherein the memory protection function, when the first or second field is set as operation-prohibited, generates a protection exception to an operation of the memory area and generates a cause code indicating a field that becomes an occurrence reason of the protection exception,
    wherein one OS of the plurality of OS's controls a first data made up of the data structure on the memory,
    wherein the control program makes the computer execute a procedure of referring to the first data; a procedure of creating a second data that is made up of the data structure and whose second field prohibits a memory operation of the memory area that requires emulation of reading/writing; a procedure of making the memory protection function refer to the second data; and a procedure of determining necessity of emulation by referring to the cause code at the time of occurrence of the protection exception,
    wherein the control program makes the computer execute a procedure of, at the time of occurrence of the protection exception, reading the cause code; and a procedure of, when the cause code indicates the first field, determining that emulation is not required,
    wherein the control program makes the computer execute a procedure of, when the cause code indicates the second field, determining necessity of emulation by referring to a use history flag which indicates whether a use history of prohibiting a memory operation by the second field exists or not,
    wherein the control program makes the computer execute a procedure of, when the cause code indicates the second field and the use history flag is being set for a condition which indicates that a history of prohibiting a memory operation by the second field does not exist, determining that emulation is required, and when the cause code indicates prohibiting a memory operation by the second field and the use history flag is being set for a condition which indicates that a history of prohibiting a memory operation by the second field exists, analyzing a setting of the data structure and determining necessity of the emulation based on whether the setting can generate the protection exception.

2. The control program of a virtual machine according to claim 1,
    wherein the CPU is an x86 compatible CPU supporting VT-x, both of the first data and the second data are each a page table, the first field is a Present bit, the second field is a Reserved bit, the cause code is an error code of a page fault, the OS has a first event handler of the OS, and the control program makes the computer execute a procedure of, at a time of occurrence of a page fault resulting from an operation of the memory area where the present bit is 0, setting page-fault error-code mask and page-fault error-code match that the CPU has so as to cause a branch directly to the first event handler of the OS.

3. The control program of a virtual machine according to claim 1,
    wherein the OS is a first OS having a function of making a plurality of second OS's operate on the first OS, the second OS's each have a third data made up of the data structure and a second event handler, the CPU is an x86 compatible CPU, each of the first data, the second data, and the third data is a page table, the first field is a Present bit, the second field is a Reserved bit, the cause code is an error code of a page fault, and the CPU is a CPU that uses a fourth page table for specifying a condition of the page fault for calling the second event handler and a fifth page table for specifying a condition of the page fault to be reported to an event handler that the control program of the virtual machine has; and wherein the control program makes the computer execute a procedure of making the CPU refer to the third data as the fourth page table, and a procedure of making the CPU refer to the second data as the fifth page table.

4. A control program of a virtual machine that makes a plurality of OS's operate using a computer having a CPU and memory, wherein the CPU has a memory protection function that is controlled based on a data structure, wherein the data structure has a first field used for determination of validity of a memory address and a second field which is a reserved field, wherein the first field and the second field control approval/disapproval of a memory operation in each memory area, wherein the memory protection function, when the first or second field is set as operation-prohibited, generates a protection exception to an operation of the memory area and generates a cause code indicating a field that becomes an occurrence reason of the protection exception, wherein one OS of the plurality of OS's controls a first data made up of the data structure on the memory, wherein the control program makes the computer execute a procedure of referring to the first data; a procedure of creating a second data that is made up of the data structure and whose second field prohibits a memory operation of the memory area that requires emulation of reading/writing; a procedure of making the memory protection function refer to the second data; and a procedure of determining necessity of emulation by referring to the cause code at the time of occurrence of the protection exception, wherein the control program makes the computer execute a procedure of, at the time of occurrence of the protection exception, reading the cause code; and a procedure of, when the cause code indicates the first field, determining that emulation is not required, wherein the control program makes the computer execute a procedure of, when the cause code indicates the second field, determining necessity of emulation by referring to a use history flag which indicates whether a use history of prohibiting a memory operation by the second field exists or not, wherein the control program makes the computer execute a procedure of, at a time of initializing the data structure of the second data, resetting the use history flag for a condition which indicates that a history of the second field does not exist; and a procedure of reading a setting of the second field in the first data, and when operation prohibition is being set, setting the use history flag for a condition which indicates that a history of the second field exists.

5. The control program of a virtual machine according to claim 4, wherein the CPU is an x86 compatible CPU supporting VT-x, both of the first data and the second data are each a page table, the first field is a Present bit, the second field is a Reserved bit, the cause code is an error code of a page fault, the OS has a first event handler of the OS, and the control program makes the computer execute a procedure of, at a time of occurrence of a page fault resulting from an operation of the memory area where the present bit is 0, setting page-fault error-code mask and page-fault error-code match that the CPU has so as to cause a branch directly to the first event handler of the OS.

6. The control program of a virtual machine according to claim 4, wherein the OS is a first OS having a function of making a plurality of second OS's operate on the first OS, the second OS's each have a third data made up of the data structure and a second event handler, the CPU is an x86 compatible CPU, each of the first data, the second data, and the third data is a page table, the first field is a Present bit, the second field is a Reserved bit, the cause code is an error code of a page fault, and the CPU is a CPU that uses a fourth page table for specifying a condition of the page fault for calling the second event handler and a fifth page table for specifying a condition of the page fault to be reported to an event handler that the control program of the virtual machine has; and wherein the control program makes the computer execute a procedure of making the CPU refer to the third data as the fourth page table, and a procedure of making the CPU refer to the second data as the fifth page table.

* * * * *